(12) United States Patent
Noyes et al.

(10) Patent No.: US 9,501,705 B2
(45) Date of Patent: Nov. 22, 2016

(54) METHODS AND APPARATUSES FOR REDUCING POWER CONSUMPTION IN A PATTERN RECOGNITION PROCESSOR

(75) Inventors: Harold B Noyes, Boise, ID (US); David R. Brown, Lucas, TX (US)

(73) Assignee: Micron Technology, Inc., Boise, ID (US)

( * ) Notice: Subject to any disclaimer, the term of this patent is extended or adjusted under 35 U.S.C. 154(b) by 702 days.

(21) Appl. No.: 12/638,751

(22) Filed: Dec. 15, 2009

(65) Prior Publication Data

US 2011/0145271 A1  Jun. 16, 2011

(51) Int. Cl.
*G06F 17/30* (2006.01)
*G06K 9/00* (2006.01)

(52) U.S. Cl.
CPC ..... *G06K 9/00986* (2013.01); *G06F 17/30516* (2013.01); *G06F 17/30985* (2013.01); *Y02B 60/188* (2013.01)

(58) Field of Classification Search
CPC ................ G06F 1/3206; G06F 1/3287; G06K 9/00973
USPC ................... 713/300, 324; 707/769
See application file for complete search history.

(56) References Cited

U.S. PATENT DOCUMENTS

| 4,254,476 A * | 3/1981 | Burrows ...................... 365/49.1 |
| 5,300,830 A | 4/1994 | Hawes |
| 5,331,227 A | 7/1994 | Hawes |
| 6,240,003 B1 | 5/2001 | McElroy |
| 6,272,616 B1 * | 8/2001 | Fernando et al. .............. 712/20 |
| 6,301,671 B1 * | 10/2001 | Boice et al. .................. 713/322 |
| 6,880,087 B1 | 4/2005 | Carter |
| 6,906,938 B2 | 6/2005 | Kaginele |
| 6,944,710 B2 | 9/2005 | Regev et al. |
| 7,089,352 B2 | 8/2006 | Regev et al. |
| 7,146,643 B2 | 12/2006 | Dapp et al. |
| 7,392,229 B2 | 6/2008 | Harris et al. |
| 7,487,131 B2 | 2/2009 | Harris et al. |
| 7,487,542 B2 | 2/2009 | Boulanger |
| 7,774,286 B1 | 8/2010 | Harris |

(Continued)

FOREIGN PATENT DOCUMENTS

| CN | 1573656 | 2/2005 |
| CN | 1666180 | 9/2005 |

(Continued)

OTHER PUBLICATIONS

Beesley, K. R.; Arabic Morphology Using Only Finite-State Operations; Xerox Research Centre Europe; pp. 50-57.

(Continued)

*Primary Examiner* — Kim Huynh
*Assistant Examiner* — Brandon Kinsey
(74) *Attorney, Agent, or Firm* — Fletcher Yoder, P.C.

(57) ABSTRACT

Apparatuses and methods are provided for reducing power consumption in a pattern-recognition processor. A power control circuit may be coupled to a block of programmed state machines to enable selective activation and deactivation of the block during a pattern search. The block may be deactivated if the pattern search is no longer active in that block and activated when needed by the pattern search. Additionally, the block may be deactivated based on an identifier of the data stream being searched. Excess blocks not used for any programmed state machines may be disabled such that they are not refreshed during a memory cycle.

37 Claims, 15 Drawing Sheets

(56) References Cited

U.S. PATENT DOCUMENTS

| | | | |
|---|---|---|---|
| 8,065,249 | B1 | 11/2011 | Harris |
| 9,014,825 | B2* | 4/2015 | Olson et al. ................. 700/11 |
| 2002/0108063 | A1* | 8/2002 | Lee et al. ..................... 713/300 |
| 2003/0051043 | A1 | 3/2003 | Wyschogrod et al. |
| 2003/0065800 | A1 | 4/2003 | Wyschogrod et al. |
| 2003/0110208 | A1 | 6/2003 | Wyschogrod et al. |
| 2006/0005056 | A1 | 1/2006 | Nishioka |
| 2006/0136570 | A1* | 6/2006 | Pandya ............. G06F 17/30985 709/217 |
| 2006/0206737 | A1* | 9/2006 | Lee ............................. 713/320 |
| 2006/0282826 | A1* | 12/2006 | Dockser ....................... 717/127 |
| 2006/0294059 | A1* | 12/2006 | Chamberlain et al. ........... 707/3 |
| 2007/0075878 | A1 | 4/2007 | Furodet et al. |
| 2007/0127482 | A1 | 6/2007 | Harris et al. |
| 2007/0282833 | A1 | 12/2007 | McMillen et al. |
| 2011/0307433 | A1 | 12/2011 | Dlugosch |
| 2011/0307503 | A1 | 12/2011 | Dlugosch |
| 2012/0192163 | A1 | 7/2012 | Glendenning |
| 2012/0192164 | A1 | 7/2012 | Xu |
| 2012/0192165 | A1 | 7/2012 | Xu |
| 2012/0192166 | A1 | 7/2012 | Xu |

FOREIGN PATENT DOCUMENTS

| | | |
|---|---|---|
| CN | 1734437 | 2/2006 |
| GB | 2402519 | 8/2004 |
| JP | 2008-276331 | 11/2008 |
| JP | 2009523275 | 6/2009 |
| WO | 03023548 | 3/2003 |
| WO | 2004006097 | 1/2004 |

OTHER PUBLICATIONS

Bird, S. et al.; One-Level Phonology: Autosegmental Representations and Rules as Finite Automata; Association for Computational Linguistics; University of Edinburgh; vol. 20; No. 1; pp. 55-90; 1994.

Bispo, J. et al.; Regular Expression Matching for Reconfigurable Packet Inspection; IEEE.

Bispo, J. et al.; Synthesis of Regular Expressions Targeting FPGAs: Current Status and Open Issues; IST/INESC-ID, Libson, Portugal; pp. 1-12.

Brodie, B. et al.; A scalable Architecture for High-Throughput Regular-Expression Pattern Matching; Exegy Inc.; pp. 1-12.

Clark, C.; Design of Efficient FPGA Circuits for Matching Complex Patterns in Network Intrusion Detection Systems (Master of Science Thesis); Georgia Institute of Technology; pp. 1-56; Dec. 2003.

Clark, C.; A Unified Model of Pattern-Matching Circuits for Field-Programmable Gate Arrays [Doctoral Dissertation]; Georgia Institute of Technology; pp. 1-177; 2006.

Clark, C. et al.; Scalable Pattern Matching for High Speed Networks; Proceedings of the 12th Annual IEEE symposium on Field-Programmable Custom Computing Machines (FCCM'04);Georgia Institute of Technology; pp. 1-9; 2004.

Clark, C. et al.; A Unified Model of Pattern-Matching Circuit Architectures; Tech Report GIT-CERCS-05-20;Georgia Institute of Technology; pp. 1-17.

Fide, S.; String Processing in Hardware; Scalable Parallel and Distributed Systems Lab; Proceedings of the 12th Annual IEEE symposium on Field-Programmable Custom Computing Machines (FCCM'04);School of Electrical and Computer Engineering; Georgia Institute of Technology; pp. 1-9; 2004.

Fisk, M. et al.; Applying Fast String Matching to Intrusion Detection; Los Alamos National Laboratory; University of California San Diego; pp. 1-21.

Korenek, J.; Traffic Scanner-Hardware Accelerated Intrusion Detection System; http://www.liberouter.org/ ;2006.

Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.

Lipovski, G.; Dynamic Systolic Associative Memory Chip; IEEE; Department of Electrical and Computer Engineering; University of Texas at Austin; pp. 481-492; 1990.

Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.

Schultz, K. et al.; Fully Parallel Integrated CAM/RAM Using Preclassification to Enable Large Capacities; IEEE Journal on Solid-State Circuits; vol. 31; No. 5; pp. 689-699; May 1996.

Shafai, F. et al.; Fully Parallel 30-MHz, 2.5-Mb CAM; IEEE Journal of Solid-State Circuits, vol. 33; No. 11; pp. 1690-1696; Nov. 1998.

Sidhu, R. et al.; Fast Regular Expression Pattern Matching using FPGAs; Department of EE-Systems; University of Southern California; pp. 1-12.

Wada, T.; Multiobject Behavior Recognition Event Driven Selective Attention Method; IEEE; pp. 1-16; 2000.

Yu, F.; High Speed Deep Packet Inspection with Hardware Support; Electrical Engineering and Computer Sciences; University of California at Berkeley; pp. 1-217; Nov. 22, 2006.

Freescale and Kaspersky ® Accelerated Antivirus Solution Platform for OEM Vendors; Freescale Semiconductors Document; pp. 1-16; 2007.

Hurson A. R.; VLSI Design for the Parallel Finite State Automation and Its Performance Evaluation as a Hardware Scanner; International Journal of Computer and Information Sciences, vol. 13, No. 6. 1984.

Noyes, et al., U.S. Appl. No. 12/253,966, filed Oct. 18, 2008, "System and Method of Indirect Register Access".

Noyes, et al., U.S. Appl. No. 12/253,967, filed Oct. 18, 2008, "Indirect Register Access Method and System".

Noyes, U.S. Appl. No. 12/265,421, filed Nov. 5, 2008, "Methods and Systems to Accomplish Variable Width Data Input".

Noyes, et al., U.S. Appl. No. 12/265,436, filed Nov. 5, 2008, "Bus Translator".

Noyes, U.S. Appl. No. 12/265,465, filed Nov. 5, 2008, "Pattern-Recognition Processor with Results Buffer".

Noyes, et al., U.S. Appl. No. 12/268,270, filed Nov. 10, 2008, "Methods and Systems for Directly Connecting Devices to Microcontrollers".

Noyes, U.S. Appl. No. 12/325,875, filed Dec. 1, 2008, "Systems and Methods for Managing Endian Mode of a Device".

Noyes, U.S. Appl. No. 12/325,982, filed Dec. 1, 2008, "Systems and Methods to Enable Identification of Different Data Sets".

Noyes, U.S. Appl. No. 12/325,986, filed Dec. 1, 2008, "Devices, Systems, and Methods to Synchronize Simultaneous DMA Parallel Processing of a Single Data Stream by Multiple Devices".

Noyes, U.S. Appl. No. 12/325,990, filed Dec. 1, 2008, "Devices, Systems, and Methods to Synchronize Parallel Processing of a Single Data Stream".

Noyes, U.S. Appl. No. 12/347,403, filed Dec. 31, 2008, "Systems, Methods, and Devices for Configuring a Device".

Pawlowski, U.S. Appl. No. 12/350,132, filed Jan. 7, 2009, "Pattern-Recognition Processor with Matching-Data Reporting Module".

Pawlowski, U.S. Appl. No. 12,350,136, filed Jan. 7, 2009, "Buses for Pattern-Recognition Processors".

Pawlowski, U.S. Appl. No. 12/350,142, filed Jan. 7, 2009, "Methods and Systems for Power Consumption Management of a Pattern-Recognition Processor".

Noyes, U.S. Appl. No. 12/352,311, filed Jan. 12, 2009, "Devices, Systems, and Methods for Communicating Pattern Matching Results of a Parallel Pattern Search Engine".

Noyes, U.S. Appl. No. 12/492,824, filed Jun. 26, 2009, "Methods and Devices for Saving and/or Restoring a State of a Pattern-Recognition Processor".

Harris, U.S. Appl. No. 60/652,738, filed Feb. 12, 2005, "Means and Mechanism for Finding Meaningful Information in Databases or Data Sets by Topical Content Patterns at Speeds Exceeding Conventional Computers".

Chinese Office Action dated Apr. 1, 2014.

Tiwari et al., "Saying Power by Mapping Finite-State Machines into Embedded Memory Blocks in FPGAs," Proceedings of the Design, Automation and Test in Europe Conference and Exhibition, 2004.

(56) References Cited

OTHER PUBLICATIONS

European Communication Pursuant to Article 94(3) dated Jun. 2, 2014.
Japanese Office Action mailed Aug. 5, 2014.
Japanese Office Action mailed Mar. 3, 2015.

* cited by examiner

METHODS AND APPARATUSES FOR REDUCING POWER CONSUMPTION IN A PATTERN RECOGNITION PROCESSOR

BACKGROUND

Field of Invention

Embodiments of the invention relate generally to pattern-recognition processors and, more specifically, in certain embodiments, to reducing power consumption of such pattern-recognition processors.

Description of Related Art

In the field of computing, pattern recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Such pattern-recognition devices may use all or almost all of the memory core available for the pattern-recognition process. That is, due to the nature of searching each data stream for one or more patterns, all or almost all of the memory core may be accessed during each processing cycle. This may result in high power consumption by the pattern recognition processor. Additionally, address-decoding techniques used with conventional DRAM devices or other memories may be unsuitable for use by a pattern-recognition device.

DETAILED DESCRIPTION

Figure 1:
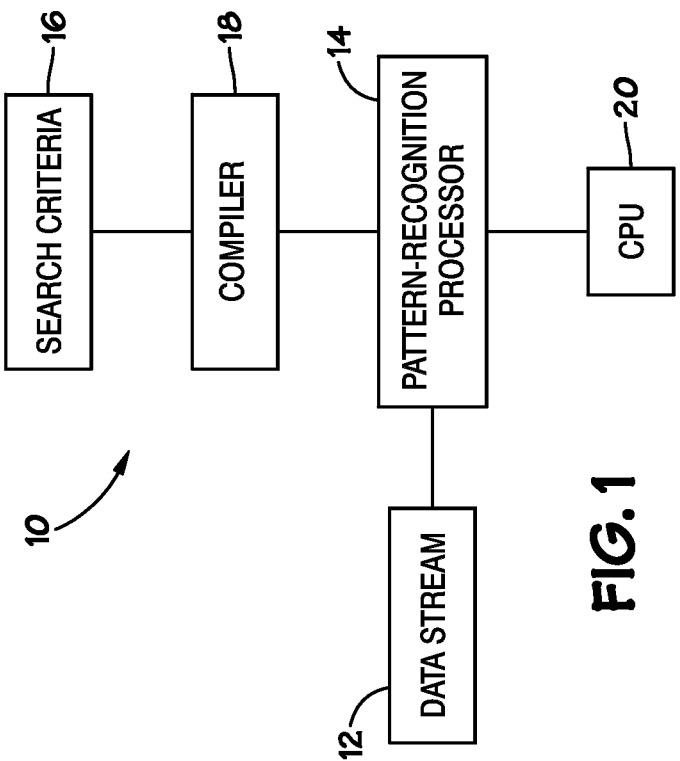
FIG. 1 depicts an example of system that searches a data stream.

FIG. 1 depicts an example of a system 10 that searches a data stream 12. The system 10 may include a pattern-recognition processor 14 that searches the data stream 12 according to search criteria 16.

Each search criterion may specify one or more target expressions, i.e., patterns. The phrase "target expression" refers to a sequence of data for which the pattern-recognition processor 14 is searching. Examples of target expressions include a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase.

A search criterion may specify more than one target expression. For example, a search criterion may specify all five-letter words beginning with the sequence of letters "cl", any word beginning with the sequence of letters "cl", a paragraph that includes the word "cloud" more than three times, etc. The number of possible sets of target expressions is arbitrarily large, e.g., there may be as many target expressions as there are permutations of data that the data stream could present. The search criteria may be expressed in a variety of formats, including as regular expressions, a programming language that concisely specifies sets of target expressions without necessarily listing each target expression.

Each search criterion may be constructed from one or more search terms. Thus, each target expression of a search criterion may include one or more search terms and some target expressions may use common search terms. As used herein, the phrase "search term" refers to a sequence of data that is searched for, during a single search cycle. The sequence of data may include multiple bits of data in a binary format or other formats, e.g., base ten, ASCII, etc. The sequence may encode the data with a single digit or multiple digits, e.g., several binary digits. For example, the pattern-recognition processor 14 may search a text data stream 12 one character at a time, and the search terms may specify a set of single characters, e.g., the letter "a", either the letters "a" or "e", or a wildcard search term that specifies a set of all single characters.

Search terms may be smaller or larger than the number of bits that specify a character (or other grapheme—i.e., fundamental unit—of the information expressed by the data stream, e.g., a musical note, a genetic base pair, a base-10 digit, or a sub-pixel). For instance, a search term may be 8 bits and a single character may be 16 bits, in which case two consecutive search terms may specify a single character.

The search criteria 16 may be formatted for the pattern-recognition processor 14 by a compiler 18. Formatting may include deconstructing search terms from the search criteria. For example, if the graphemes expressed by the data stream 12 are larger than the search terms, the compiler may deconstruct the search criterion into multiple search terms to search for a single grapheme. Similarly, if the graphemes expressed by the data stream 12 are smaller than the search terms, the compiler 18 may provide a single search term, with unused bits, for each separate grapheme. The compiler 18 may also format the search criteria 16 to support various regular expressions operators that are not natively supported by the pattern-recognition processor 14.

The pattern-recognition processor 14 may search the data stream 12 by evaluating each new term from the data stream 12. The word "term" here refers to the amount of data that could match a search term. During a search cycle, the pattern-recognition processor 14 may determine whether the currently presented term matches the current search term in the search criterion. If the term matches the search term, the evaluation is "advanced", i.e., the next term is compared to the next search term in the search criterion. If the term does not match, the next term is compared to the first term in the search criterion, thereby resetting the search.

Each search criterion may be compiled into a different finite state machine (FSM) in the pattern-recognition processor 14. The finite state machines may run in parallel, searching the data stream 12 according to the search criteria 16. The finite state machines may step through each successive search term in a search criterion as the preceding search term is matched by the data stream 12, or if the search term is unmatched, the finite state machines may begin searching for the first search term of the search criterion.

The pattern-recognition processor 14 may evaluate each new term according to several search criteria, and their respective search terms, at about the same time, e.g., during a single device cycle. The parallel finite state machines may each receive the term from the data stream 12 at about the same time, and each of the parallel finite state machines may determine whether the term advances the parallel finite state machine to the next search term in its search criterion. The parallel finite state machines may evaluate terms according to a relatively large number of search criteria, e.g., more than 100, more than 1000, or more than 10,000. Because they operate in parallel, they may apply the search criteria to a data stream 12 having a relatively high bandwidth, e.g., a data stream 12 of greater than or generally equal to 64 MB per second or 128 MB per second, without slowing the data stream. In some embodiments, the search-cycle duration does not scale with the number of search criteria, so the number of search criteria may have little to no effect on the performance of the pattern-recognition processor 14.

When a search criterion is satisfied (i.e., after advancing to the last search term and matching it), the pattern-recognition processor 14 may report the satisfaction of the criterion to a processing unit, such as a central processing unit (CPU) 20. The central processing unit 20 may control the pattern-recognition processor 14 and other portions of the system 10.

The system 10 may be any of a variety of systems or devices that search a stream of data. For example, the system 10 may be a desktop, laptop, handheld or other type of computer that searches the data stream 12. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The data stream 12 may be one or more of a variety of types of data streams that a user or other entity might wish to search. For example, the data stream 12 may be a stream of data received over a network, such as packets received over the Internet or voice or data received over a cellular network. The data stream 12 may be data received from a sensor in communication with the system 10, such as an imaging sensor, a temperature sensor, an accelerometer, or the like, or combinations thereof. The data stream 12 may be received by the system 10 as a serial data stream, in which the data is received in an order that has meaning, such as in a temporally, lexically, or semantically significant order. Or the data stream 12 may be received in parallel or out of order and, then, converted into a serial data stream, e.g., by reordering packets received over the Internet. In some embodiments, the data stream 12 may present terms serially, but the bits expressing each of the terms may be received in parallel. The data stream 12 may be received from a source external to the system 10, or may be formed by interrogating a memory device and forming the data stream 12 from stored data.

Depending on the type of data in the data stream 12, different types of search criteria may be chosen by a designer. For instance, the search criteria 16 may be a virus definition file. Viruses or other malware may be characterized, and aspects of the malware may be used to form search criteria that indicate whether the data stream 12 is likely delivering malware. The resulting search criteria may be stored on a server, and an operator of a client system may subscribe to a service that downloads the search criteria to the system 10. The search criteria 16 may be periodically updated from the server as different types of malware emerge. The search criteria may also be used to specify undesirable content that might be received over a network, for instance unwanted emails (commonly known as spam) or other content that a user finds objectionable.

The data stream 12 may be searched by a third party with an interest in the data being received by the system 10. For example, the data stream 12 may be searched for text, a sequence of audio, or a sequence of video that occurs in a copyrighted work. The data stream 12 may be searched for utterances that are relevant to a criminal investigation or civil proceeding or are of interest to an employer. In other embodiments, monitoring a data stream for data of interest may be an example of searching.

The search criteria 16 may also include patterns in the data stream 12 for which a translation is available, e.g., in memory addressable by the CPU 20 or the pattern-recognition processor 14. For instance, the search criteria 16 may each specify an English word for which a corresponding Spanish word is stored in memory. In another example, the search criteria 16 may specify encoded versions of the data stream 12, e.g., MP3, MPEG 4, FLAC, Ogg Vorbis, etc., for which a decoded version of the data stream 12 is available, or vice versa.

The pattern-recognition processor 14 may be hardware that is integrated with the CPU 20 into a single component (such as a single device) or may be formed as a separate component. For instance, the pattern-recognition processor 14 may be a separate integrated circuit. The pattern-recognition processor 14 may be referred to as a "co-processor" or a "pattern-recognition co-processor".

Figure 2:
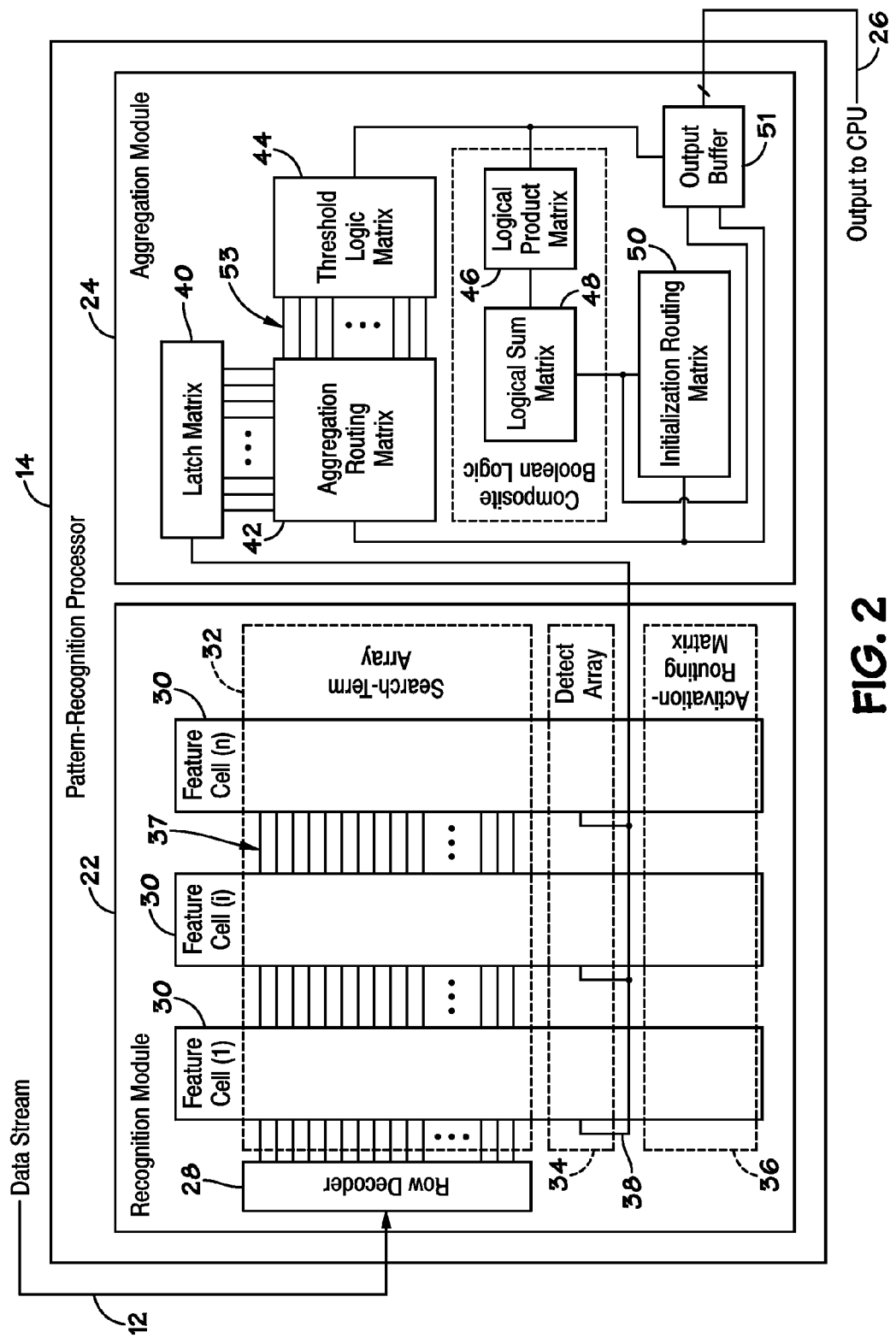
FIG. 2 depicts an example of a pattern-recognition processor in the system of FIG. 1.

FIG. 2 depicts an example of the pattern-recognition processor 14. The pattern-recognition processor 14 may include a recognition module 22 and an aggregation module 24. The recognition module 22 may be configured to compare received terms to search terms, and both the recognition module 22 and the aggregation module 24 may cooperate to determine whether matching a term with a search term satisfies a search criterion.

The recognition module 22 may include a row decoder 28 and a plurality of feature cells 30. Each feature cell 30 may specify a search term, and groups of feature cells 30 may form a parallel finite state machine that forms a search criterion. Components of the feature cells 30 may form a search-term array 32, a detection array 34, and an activation-routing matrix 36. The search-term array 32 may include a plurality of input conductors 37, each of which may place each of the feature cells 30 in communication with the row decoder 28.

The row decoder 28 may select particular conductors among the plurality of input conductors 37 based on the content of the data stream 12. For example, the row decoder 28 may be a one byte to 256 row decoder that activates one of 256 rows based on the value of a received byte, which may represent one term. A one-byte term of 0000 0000 may correspond to the top row among the plurality of input conductors 37, and a one-byte term of 1111 1111 may correspond to the bottom row among the plurality of input conductors 37. Thus, different input conductors 37 may be selected, depending on which terms are received from the data stream 12. As different terms are received, the row decoder 28 may deactivate the row corresponding to the previous term and activate the row corresponding to the new term.

The detection array 34 may couple to a detection bus 38 that outputs signals indicative of complete or partial satisfaction of search criteria to the aggregation module 24. The activation-routing matrix 36 may selectively activate and deactivate feature cells 30 based on, for example, search terms in a search criterion that have been matched.

The aggregation module 24 may include a latch matrix 40, an aggregation-routing matrix 42, a threshold-logic matrix 44, a logical-product matrix 46, a logical-sum matrix 48, and an initialization-routing matrix 50.

The latch matrix 40 may implement portions of certain search criteria. Some search criteria, e.g., some regular expressions, count only the first occurrence of a match or group of matches. The latch matrix 40 may include latches that record whether a match has occurred. The latches may be cleared during initialization, and periodically re-initialized during operation, as search criteria are determined to be satisfied or not further satisfiable—i.e., an earlier search term may need to be matched again before the search criterion could be satisfied.

The aggregation-routing matrix 42 may function similar to the activation-routing matrix 36. The aggregation-routing matrix 42 may receive signals indicative of matches on the detection bus 38 and may route the signals to different group-logic lines 53 connecting to the threshold-logic matrix 44. The aggregation-routing matrix 42 may also route outputs of the initialization-routing matrix 50 to the detection array 34 to reset portions of the detection array 34 when a search criterion is determined to be satisfied or not further satisfiable.

The threshold-logic matrix 44 may include a plurality of counters, e.g., 32-bit counters configured to count up or down. The threshold-logic matrix 44 may be loaded with an initial count, and it may count up or down from the count based on matches signaled by the recognition module. For instance, the threshold-logic matrix 44 may count the number of occurrences of a word in some length of text.

The outputs of the threshold-logic matrix 44 may be inputs to the logical-product matrix 46. The logical-product matrix 46 may selectively generate "product" results (e.g., "AND" function in Boolean logic). The logical-product matrix 46 may be implemented as a square matrix, in which the number of output products is equal the number of input lines from the threshold-logic matrix 44, or the logical-product matrix 46 may have a different number of inputs than outputs. The resulting product values may be output to the logical-sum matrix 48.

The logical-sum matrix 48 may selectively generate sums (e.g., "OR" functions in Boolean logic.) The logical-sum matrix 48 may also be a square matrix, or the logical-sum matrix 48 may have a different number of inputs than outputs. Since the inputs are logical products, the outputs of the logical-sum matrix 48 may be logical-Sums-of-Products (e.g., Boolean logic Sum-of-Product (SOP) form). The output of the logical-sum matrix 48 may be received by the initialization-routing matrix 50.

The initialization-routing matrix 50 may reset portions of the detection array 34 and the aggregation module 24 via the aggregation-routing matrix 42. The initialization-routing matrix 50 may also be implemented as a square matrix, or the initialization-routing matrix 50 may have a different number of inputs than outputs. The initialization-routing matrix 50 may respond to signals from the logical-sum matrix 48 and re-initialize other portions of the pattern-recognition processor 14, such as when a search criterion is satisfied or determined to be not further satisfiable.

The aggregation module 24 may include an output buffer 51 that receives the outputs of the threshold-logic matrix 44, the aggregation-routing matrix 42, and the logical-sum matrix 48. The output of the aggregation module 24 may be transmitted from the output buffer 51 to the CPU 20 (FIG. 1) on the output bus 26. In some embodiments, an output multiplexer may multiplex signals from these components 42, 44, and 48 and output signals indicative of satisfaction of criteria or matches of search terms to the CPU 20 (FIG. 1). In other embodiments, results from the pattern-recognition processor 14 may be reported without transmitting the signals through the output multiplexer, which is not to suggest that any other feature described herein could not also be omitted. For example, signals from the threshold-logic matrix 44, the logical-product matrix 46, the logical-sum matrix 48, or the initialization routing matrix 50 may be transmitted to the CPU in parallel on the output bus 26.

Figure 3:
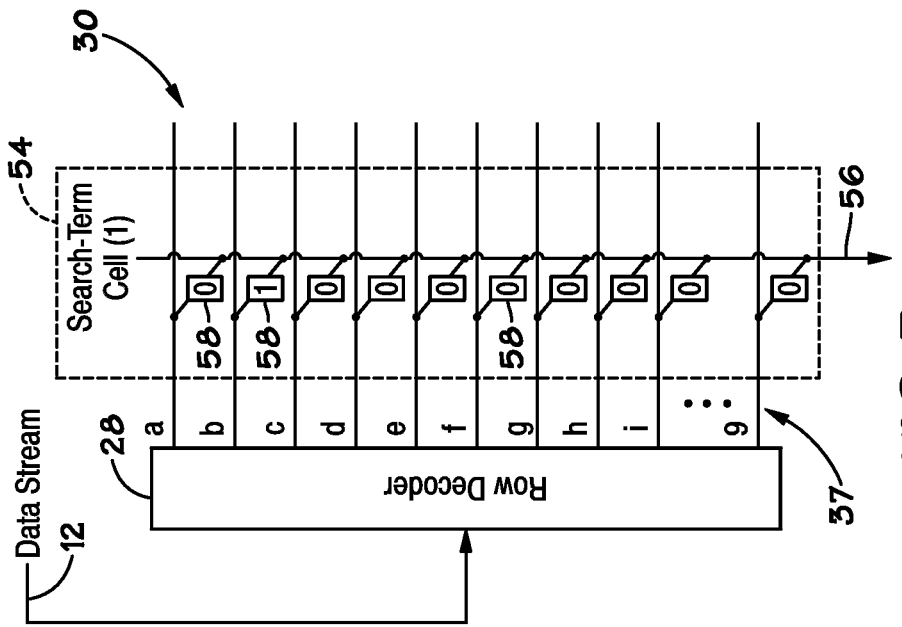
FIG. 3 depicts an example of a search-term cell in the pattern-recognition processor of FIG. 2.

FIG. 3 illustrates a portion of a single feature cell 30 in the search-term array 32 (FIG. 2), a component referred to herein as a search-term cell 54. The search-term cells 54 may include an output conductor 56 and a plurality of memory cells 58. Each of the memory cells 58 may be coupled to both the output conductor 56 and one of the conductors among the plurality of input conductors 37. In response to its input conductor 37 being selected, each of the memory cells 58 may output a value indicative of its stored value, outputting the data through the output conductor 56. In some embodiments, the plurality of input conductors 37 may be referred to as "word lines", and the output conductor 56 may be referred to as a "data line".

The memory cells 58 may include any of a variety of types of memory cells. For example, the memory cells 58 may be volatile memory, such as dynamic random access memory (DRAM) cells having a transistor and a capacitor. The source and the drain of the transistor may be connected to a plate of the capacitor and the output conductor 56, respectively, and the gate of the transistor may be connected to one of the input conductors 37. In another example of volatile memory, each of the memory cells 58 may include a static random access memory (SRAM) cell. The SRAM cell may have an output that is selectively coupled to the output conductor 56 by an access transistor controlled by one of the input conductors 37. The memory cells 58 may also include nonvolatile memory, such as phase-change memory (e.g., an ovonic device), flash memory, silicon-oxide-nitride-oxide-silicon (SONOS) memory, magneto-resistive memory, or other types of nonvolatile memory. The memory cells 58 may also include flip-flops, e.g., memory cells made out of logic gates.

Figure 4:
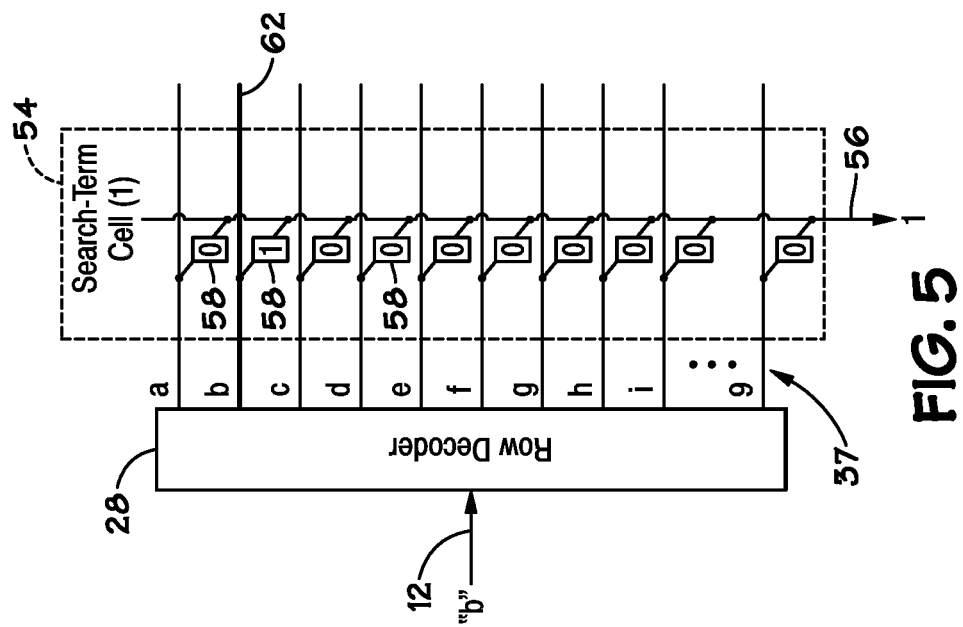
FIGS. 4 and 5 depict the search-term cell of FIG. 3 searching the data stream for a single character.
Figure 5:
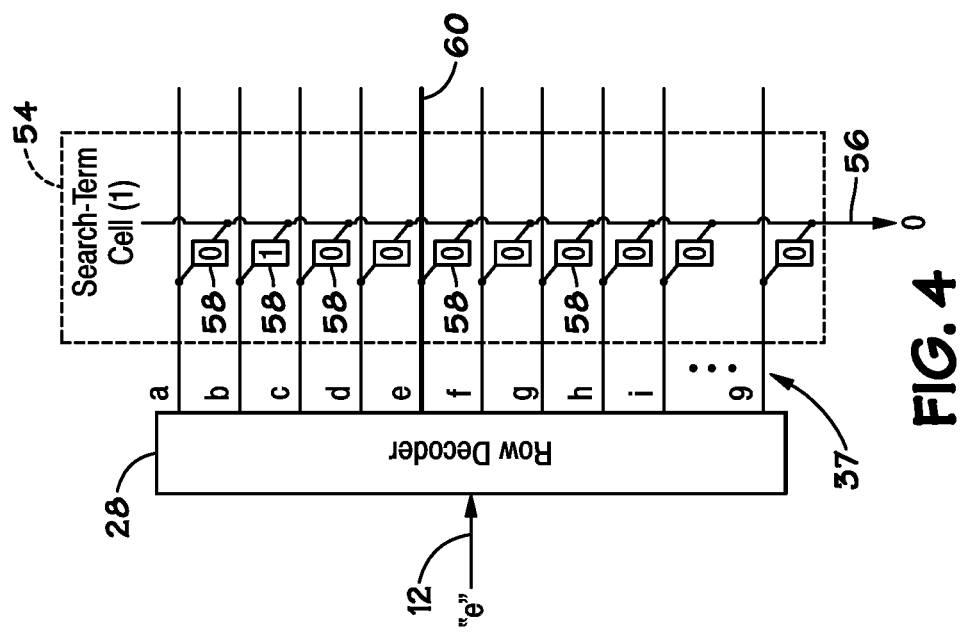

FIGS. 4 and 5 depict an example of the search-term cell 54 in operation. FIG. 4 illustrates the search-term cell 54 receiving a term that does not match the cell's search term, and FIG. 5 illustrates a match.

As illustrated by FIG. 4, the search-term cell 54 may be configured to search for one or more terms by storing data in the memory cells 58. The memory cells 58 may each represent a term that the data stream 12 might present, e.g., in FIG. 3, each memory cell 58 represents a single letter or number, starting with the letter "a" and ending with the number "9". Memory cells 58 representing terms that satisfy the search term may be programmed to store a first value, and memory cells 58 that do not represent terms that satisfy the search term may be programmed to store a different value. In the illustrated example, the search-term cell 54 is configured to search for the letter "b". The memory cells 58 that represent "b" may store a 1, or logic high, and the memory cells 58 that do not represent "b" may be programmed to store a 0, or logic low.

To compare a term from the data stream 12 with the search term, the row decoder 28 may select the input conductor 37 coupled to memory cells 58 representing the received term. In FIG. 4, the data stream 12 presents a lowercase "e". This term may be presented by the data stream 12 in the form of an eight-bit ASCII code, and the row decoder 28 may interpret this byte as a row address, outputting a signal on the conductor 60 by energizing it.

In response, the memory cell 58 controlled by the conductor 60 may output a signal indicative of the data that the memory cell 58 stores, and the signal may be conveyed by the output conductor 56. In this case, because the letter "e" is not one of the terms specified by the search-term cell 54, it does not match the search term, and the search-term cell 54 outputs a 0 value, indicating no match was found.

In FIG. 5, the data stream 12 presents a character "b". Again, the row decoder 28 may interpret this term as an address, and the row decoder 28 may select the conductor 62. In response, the memory cell 58 representing the letter "b" outputs its stored value, which in this case is a 1, indicating a match.

The search-term cells 54 may be configured to search for more than one term at a time. Multiple memory cells 58 may be programmed to store a 1, specifying a search term that matches with more than one term. For instance, the memory cells 58 representing the letters lowercase "a" and uppercase "A" may be programmed to store a 1, and the search-term cell 54 may search for either term. In another example, the search-term cell 54 may be configured to output a match if any character is received. All of the memory cells 58 may be programmed to store a 1, such that the search-term cell 54 may function as a wildcard term in a search criterion.

Figure 6:
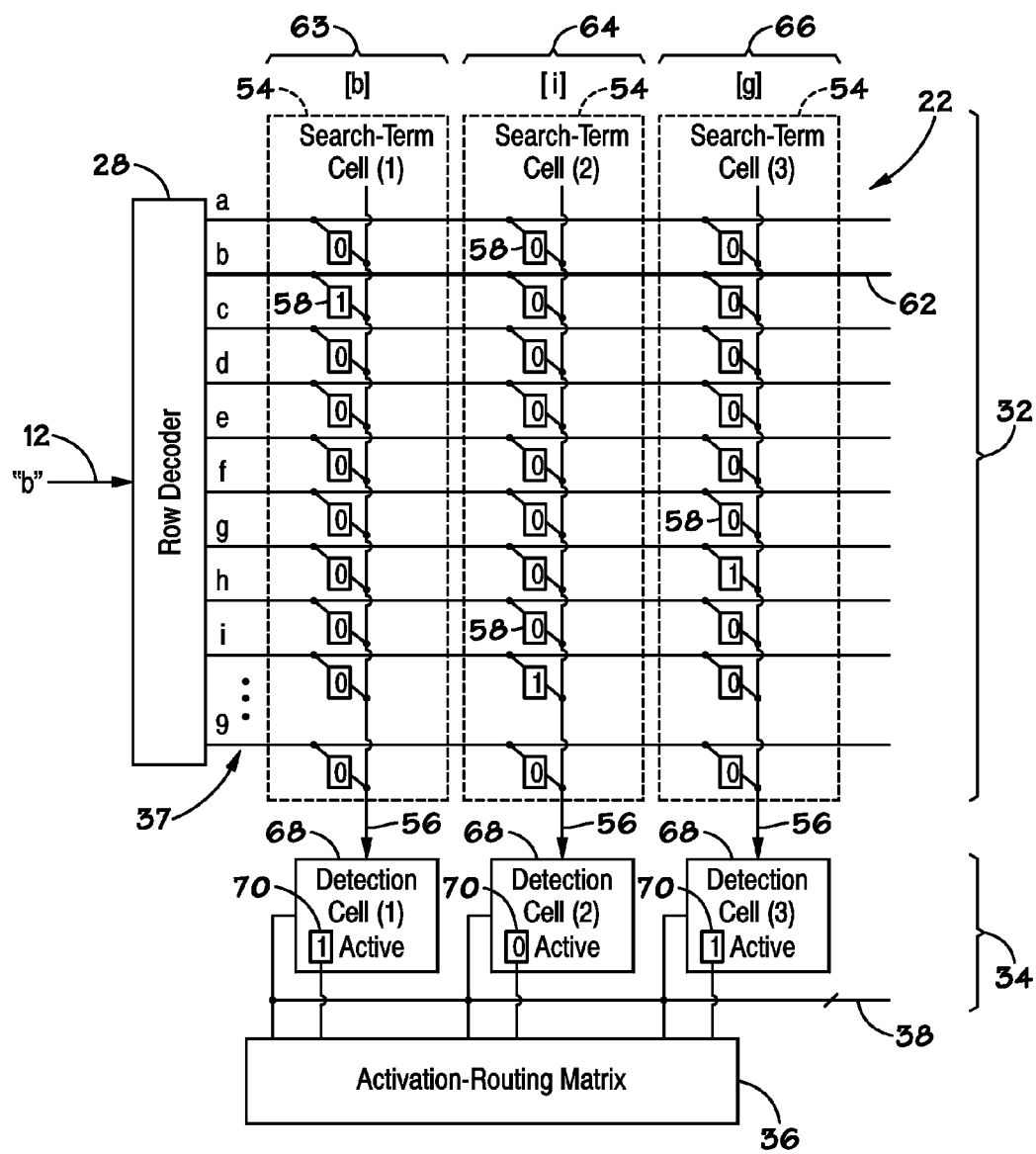
FIGS. 6-8 depict a recognition module including several search-term cells searching the data stream for a word.
Figure 7:
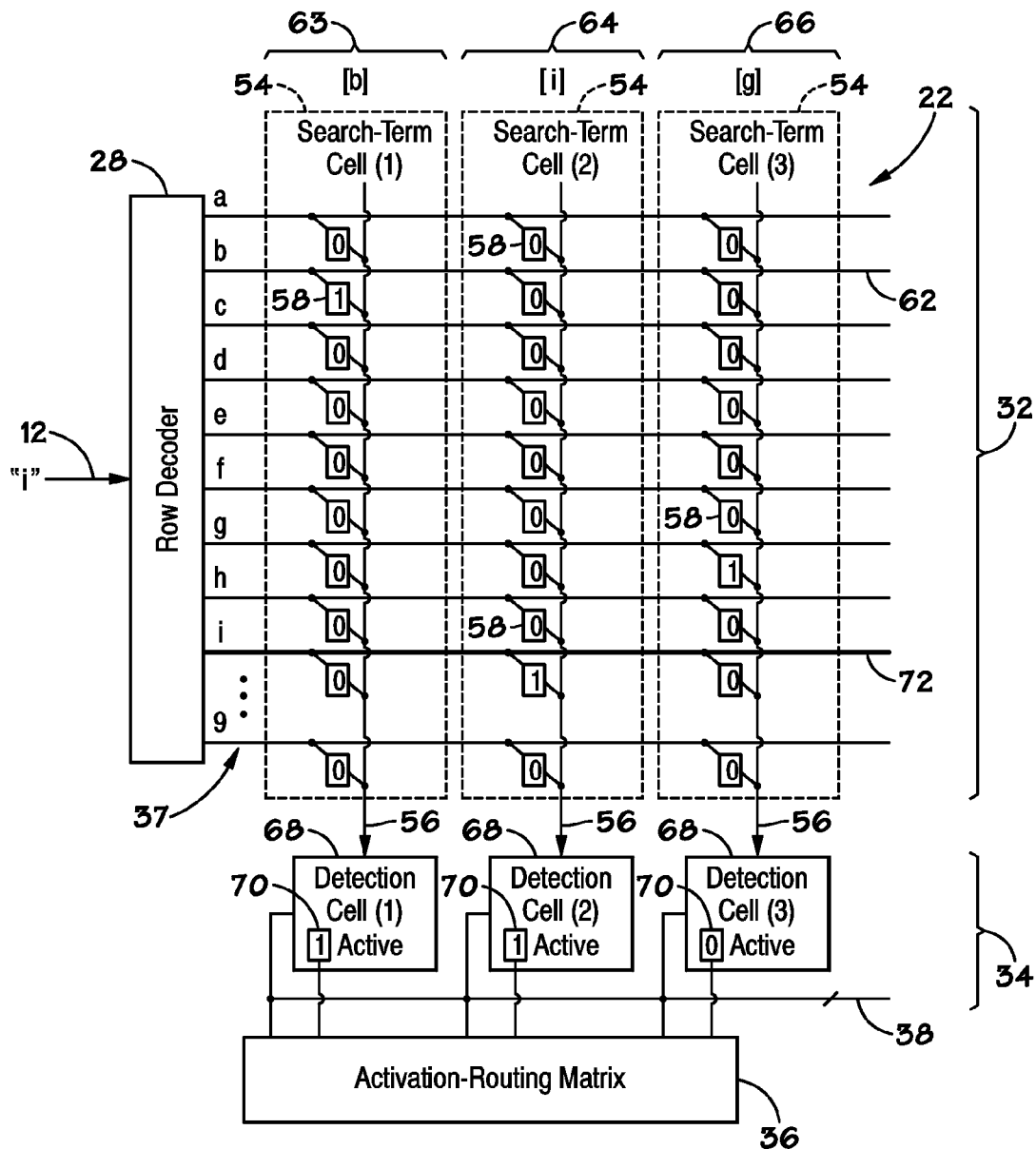
Figure 8:
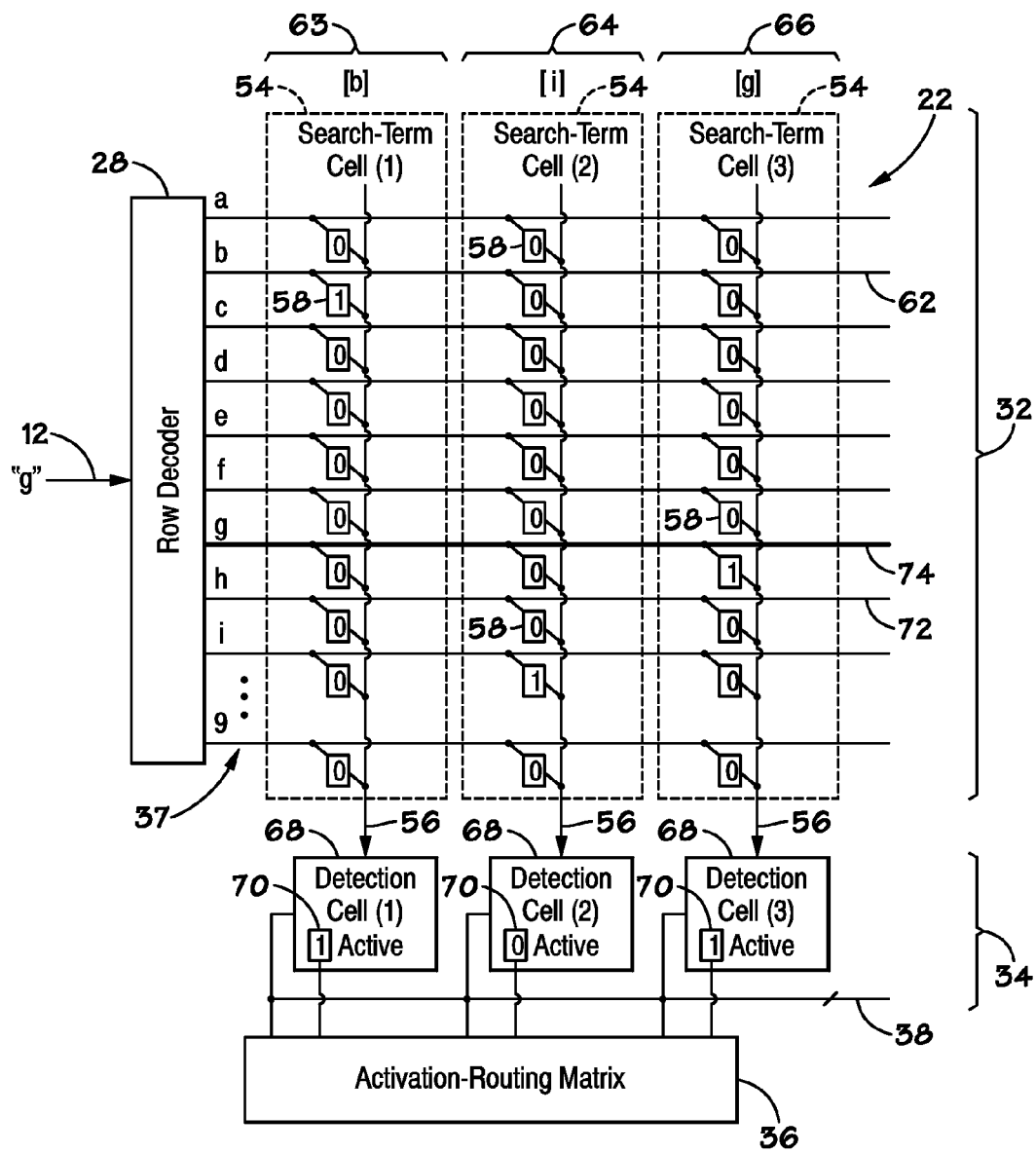

FIGS. 6-8 depict the recognition module 22 searching according to a multi-term search criterion, e.g., for a word. Specifically, FIG. 6 illustrates the recognition module 22 detecting the first letter of a word, FIG. 7 illustrates detection of the second letter, and FIG. 8 illustrates detection of the last letter.

As illustrated by FIG. 6, the recognition module 22 may be configured to search for the word "big". Three adjacent feature cells 63, 64, and 66 are illustrated. The feature cell 63 is configured to detect the letter "b". The feature cell 64 is configured to detect the letter "i". And the feature cell 66 is configured to both detect the letter "g" and indicate that the search criterion is satisfied.

FIG. 6 also depicts additional details of the detection array 34. The detection array 34 may include a detection cell 68 in each of the feature cells 63, 64, and 66. Each of the detection cells 68 may include a memory cell 70, such as one of the types of memory cells described above (e.g., a flip-flop), that indicates whether the feature cell 63, 64, or 66 is active or inactive. The detection cells 68 may be configured to output a signal to the activation-routing matrix 36 indicating whether the detection cell both is active and has received a signal from its associated search-term cell 54 indicating a match. Inactive features cells 63, 64, and 66 may disregard matches. Each of the detection cells 68 may include an AND gate with inputs from the memory cell 70 and the output conductor 56. The output of the AND gate may be routed to both the detection bus 38 and the activation-routing matrix 36, or one or the other.

The activation-routing matrix 36, in turn, may selectively activate the feature cells 63, 64, and 66 by writing to the memory cells 70 in the detection array 34. The activation-routing matrix 36 may activate feature cells 63, 64, or 66 according to the search criterion and which search term is being searched for next in the data stream 12.

In FIG. 6, the data stream 12 presents the letter "b". In response, each of the feature cells 63, 64, and 66 may output a signal on their output conductor 56, indicating the value stored in the memory cell 58 connected to the conductor 62, which represents the letter "b". The detection cells 56 may then each determine whether they have received a signal indicating a match and whether they are active. Because the feature cell 63 is configured to detect the letter "b" and is active, as indicated by its memory cell 70, the detection cell 68 in the feature cell 63 may output a signal to the activation-routing matrix 36 indicating that the first search term of the search criterion has been matched.

As illustrated by FIG. 7, after the first search term is matched, the activation-routing matrix 36 may activate the next feature cell 64 by writing a 1 to its memory cell 70 in its detection cell 68. The activation-routing matrix 36 may also maintain the active state of the feature cell 63, in case the next term satisfies the first search term, e.g., if the sequence of terms "bbig" is received. The first search term of search criteria may be maintained in an active state during a portion or substantially all of the time during which the data stream 12 is searched.

In FIG. 7, the data stream 12 presents the letter "i" to the recognition module 22. In response, each of the feature cells 63, 64, and 66 may output a signal on their output conductor 56, indicating the value stored in the memory cell 58 connected to the conductor 72, which represents the letter "i". The detection cells 56 may then each determine whether they have received a signal indicating a match and whether they are active. Because the feature cell 64 is configured to detect the letter "i" and is active, as indicated by its memory cell 70, the detection cell 68 in the feature cell 64 may output a signal to the activation-routing matrix 36 indicating that the next search term of its search criterion has been matched.

Next, the activation-routing matrix 36 may activate the feature cell 66, as illustrated by FIG. 8. Before evaluating the next term, the feature cell 64 may be deactivated. The feature cell 64 may be deactivated by its detection cell 68 resetting its memory cell 70 between detection cycles or the activation-routing matrix 36 may deactivate the feature cell 64, for example.

In FIG. 8, the data stream 12 presents the term "g" to the row decoder 28, which selects the conductor 74 representing the term "g". In response, each of the feature cells 63, 64, and 66 may output a signal on their output conductor 56, indicating the value stored in the memory cell 58 connected to the conductor 74, which represents the letter "g". The detection cells 56 may then each determine whether they have received a signal indicating a match and whether they are active. Because the feature cell 66 is configured to detect the letter "g" and is active, as indicated by its memory cell 70, the detection cell 68 in the feature cell 66 may output a signal to the activation routing matrix 36 indicating that the last search term of its search criterion has been matched.

The end of a search criterion or a portion of a search criterion may be identified by the activation-routing matrix 36 or the detection cell 68. These components 36 or 68 may include memory indicating whether their feature cell 63, 64, or 66 specifies the last search term of a search criterion or a component of a search criterion. For example, a search criterion may specify all sentences in which the word "cattle" occurs twice, and the recognition module may output a signal indicating each occurrence of "cattle" within a sentence to the aggregation module, which may count the occurrences to determine whether the search criterion is satisfied.

Feature cells 63, 64, or 66 may be activated under several conditions. A feature cell 63, 64, or 66 may be "always active", meaning that it remains active during all or substantially all of a search. An example of an always active feature cell 63, 64, or 66 is the first feature cell of the search criterion, e.g., feature cell 63.

A feature cell 63, 64, or 66 may be "active when requested", meaning that the feature cell 63, 64, or 66 is active when some condition precedent is matched, e.g., when the preceding search terms in a search criterion are matched. An example is the feature cell 64, which is active when requested by the feature cell 63 in FIGS. 6-8, and the feature cell 66, which active when requested by the feature cell 64.

A feature cell 63, 64, or 66 may be "self activated", meaning that once it is activated, it activates itself as long as its search term is matched. For example, a self activated feature cell having a search term that is matched by any numerical digit may remain active through the sequence "123456xy" until the letter "x" is reached. Each time the search term of the self activated feature cell is matched, it may activate the next feature cell in the search criterion. Thus, an always active feature cell may be formed from a self activating feature cell and an active when requested feature cell: the self activating feature cell may be programmed with all of its memory cells 58 storing a 1, and it may repeatedly activate the active when requested feature cell after each term. In some embodiments, each feature cell 63, 64, and 66 may include a memory cell in its detection cell 68 or in the activation-routing matrix 36 that specifies whether the feature cell is always active, thereby forming an always active feature cell from a single feature cell.

Figure 9:
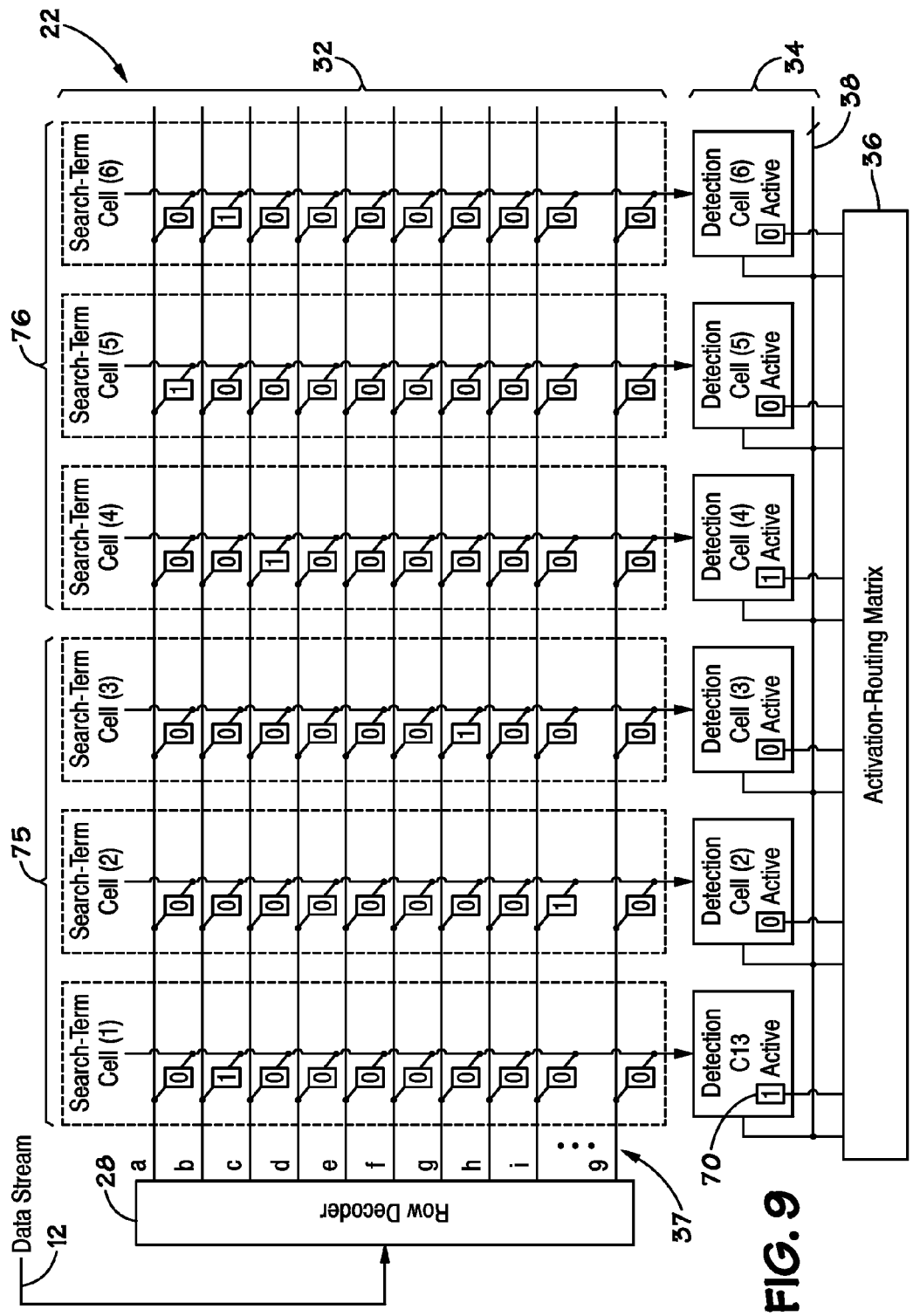
FIG. 9 depicts the recognition module configured to search the data stream for two words in parallel.

FIG. 9 depicts an example of a recognition module 22 configured to search according to a first search criterion 75 and a second search criterion 76 in parallel. In this example, the first search criterion 75 specifies the word "big", and the second search criterion 76 specifies the word "cab". A signal indicative of the current term from the data stream 12 may be communicated to feature cells in each search criterion 75 and 76 at generally the same time. Each of the input conductors 37 spans both of the search criteria 75 and 76. As a result, in some embodiments, both of the search criteria 75 and 76 may evaluate the current term generally simultaneously. This is believed to speed the evaluation of search criteria. Other embodiments may include more feature cells configured to evaluate more search criteria in parallel. For example, some embodiments may include more than 100, 500, 1000, 5000, or 10,000 feature cells operating in parallel. These feature cells may evaluate hundreds or thousands of search criteria generally simultaneously.

Search criteria with different numbers of search terms may be formed by allocating more or fewer feature cells to the search criteria. Simple search criteria may consume fewer resources in the form of feature cells than complex search criteria. This is believed to reduce the cost of the pattern-recognition processor 14 (FIG. 2) relative to processors with a large number of generally identical cores, all configured to evaluate complex search criteria.

Figure 10:
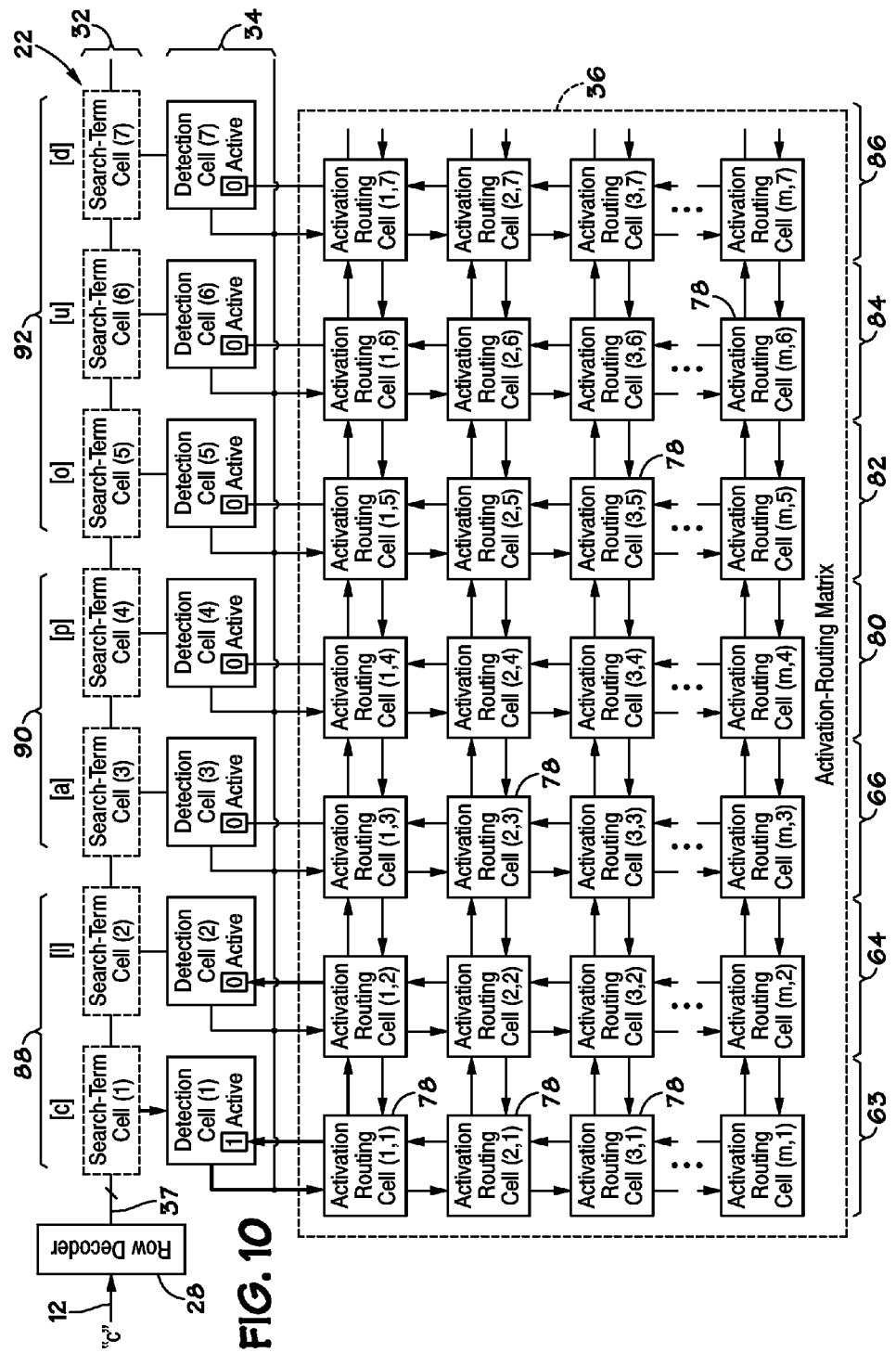
FIGS. 10-12 depict the recognition module searching according to a search criterion that specifies multiple words with the same prefix.
Figure 11:
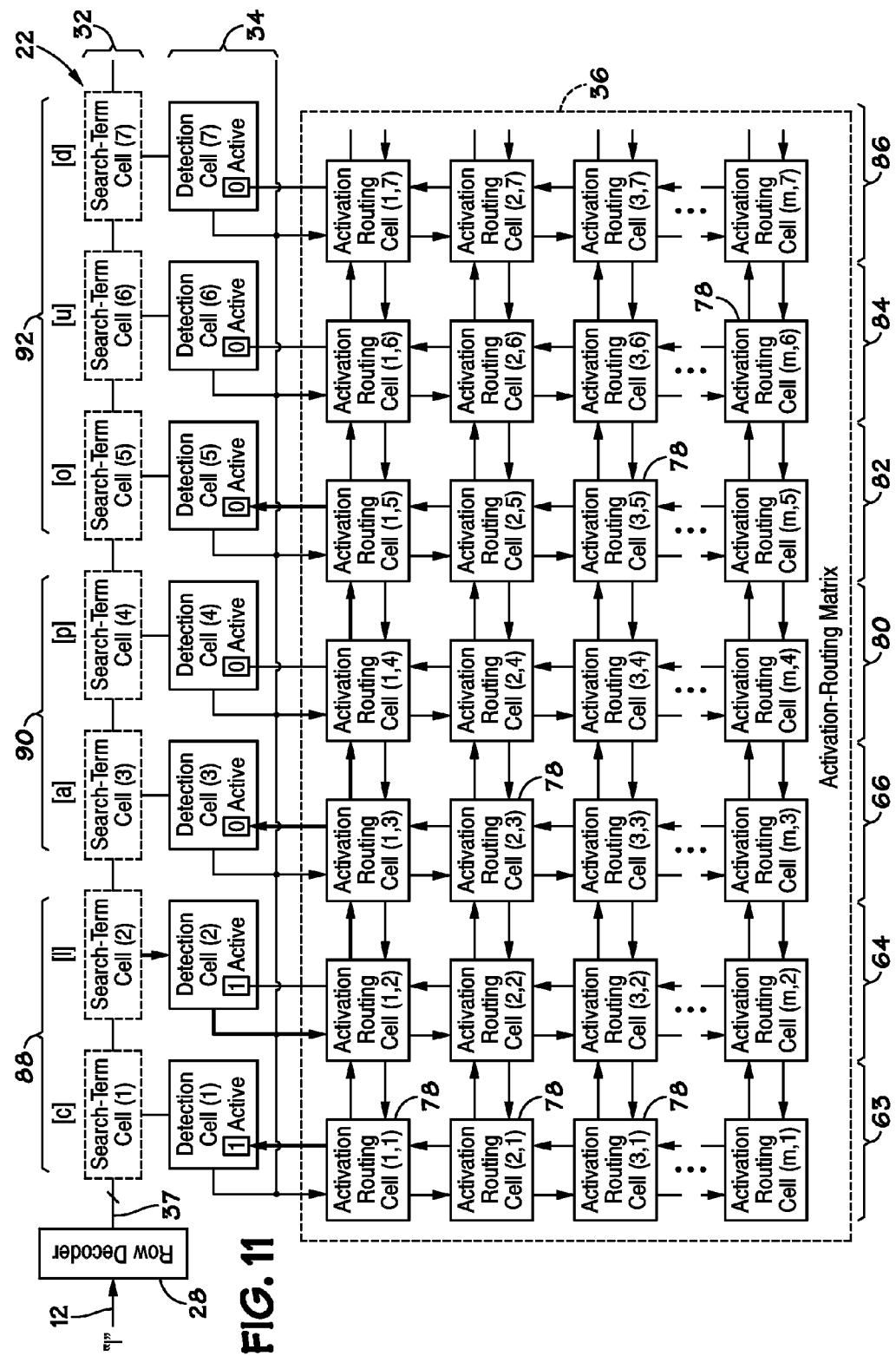
Figure 12:
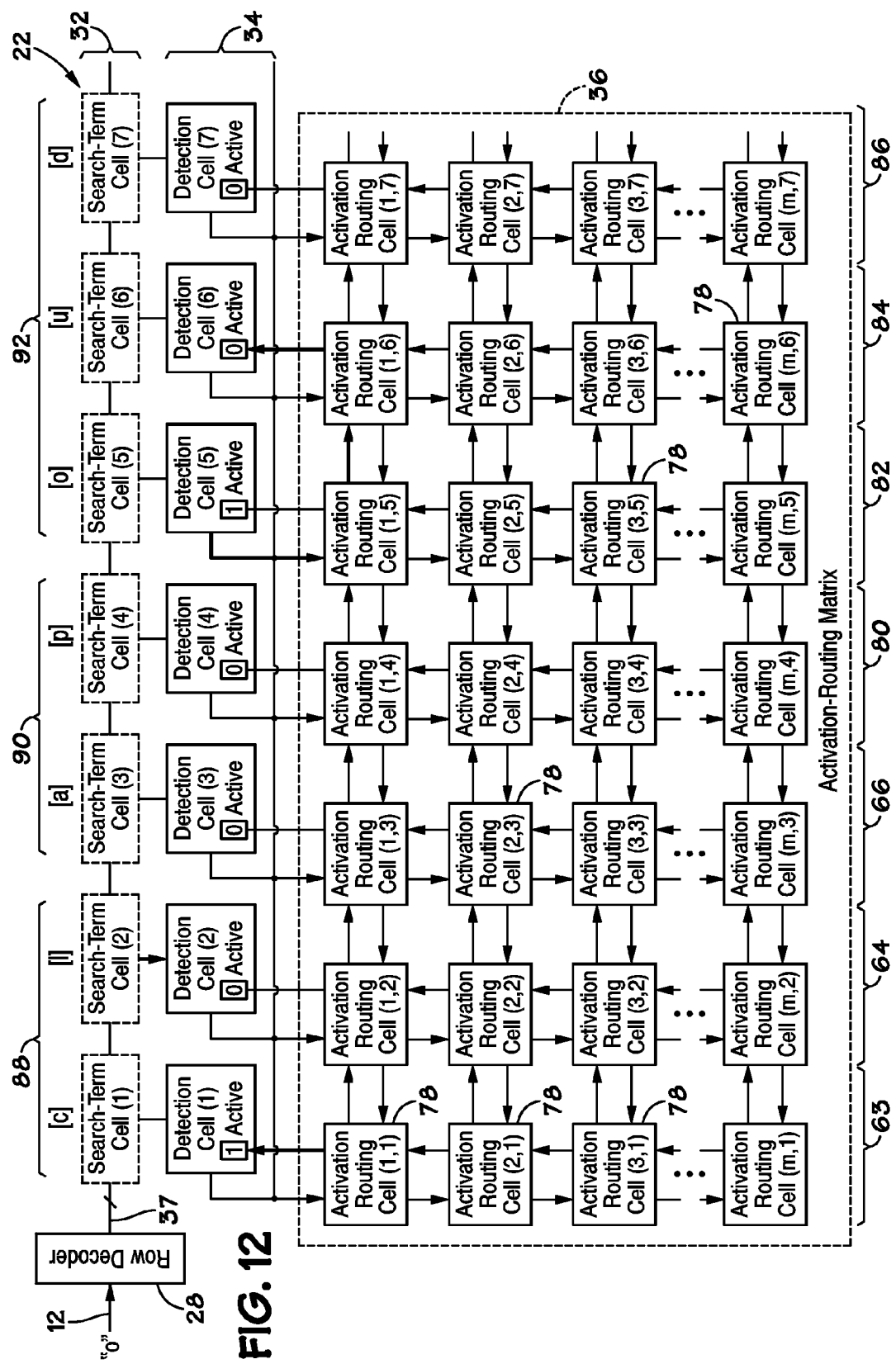

FIGS. 10-12 depict both an example of a more complex search criterion and features of the activation-routing matrix 36. The activation-routing matrix 36 may include a plurality of activation-routing cells 78, groups of which may be associated with each of the feature cells 63, 64, 66, 80, 82, 84, and 86. For instance, each of the feature cells may include 5, 10, 20, 50, or more activation-routing cells 78. The activation-routing cells 78 may be configured to transmit activation signals to the next search term in a search criterion when a preceding search term is matched. The activation-routing cells 78 may be configured to route activation signals to adjacent feature cells or other activation-routing cells 78 within the same feature cell. The activation-routing cells 78 may include memory that indicates which feature cells correspond to the next search term in a search criterion.

As illustrated by FIGS. 10-12, the recognition module 22 may be configured to search according to complex search criteria than criteria that specify single words. For instance, the recognition module 22 may be configured to search for words beginning with a prefix 88 and ending with one of two suffixes 90 or 92. The illustrated search criterion specifies words beginning with the letters "c" and "l" in sequence and ending with either the sequence of letters "ap" or the sequence of letters "oud". This is an example of a search criterion specifying multiple target expressions, e.g., the word "clap" or the word "cloud".

In FIG. 10, the data stream 12 presents the letter "c" to the recognition module 22, and feature cell 63 is both active and detects a match. In response, the activation-routing matrix 36 may activate the next feature cell 64. The activation-routing matrix 36 may also maintain the active state of the feature cell 63, as the feature cell 63 is the first search term in the search criterion.

In FIG. 11, the data stream 12 presents a letter "l", and the feature cell 64 recognizes a match and is active. In response, the activation-routing matrix 36 may transmit an activation signal both to the first feature cell 66 of the first suffix 90 and to the first feature cell 82 of the second suffix 92. In other examples, more suffixes may be activated, or multiple prefixes may active one or more suffixes.

Next, as illustrated by FIG. 12, the data stream 12 presents the letter "o" to the recognition module 22, and the feature cell 82 of the second suffix 92 detects a match and is active. In response, the activation-routing matrix 36 may activate the next feature cell 84 of the second suffix 92. The search for the first suffix 90 may die out, as the feature cell 66 is allowed to go inactive. The steps illustrated by FIGS. 10-12 may continue through the letters "u" and "d", or the search may die out until the next time the prefix 88 is matched.

Figure 13:
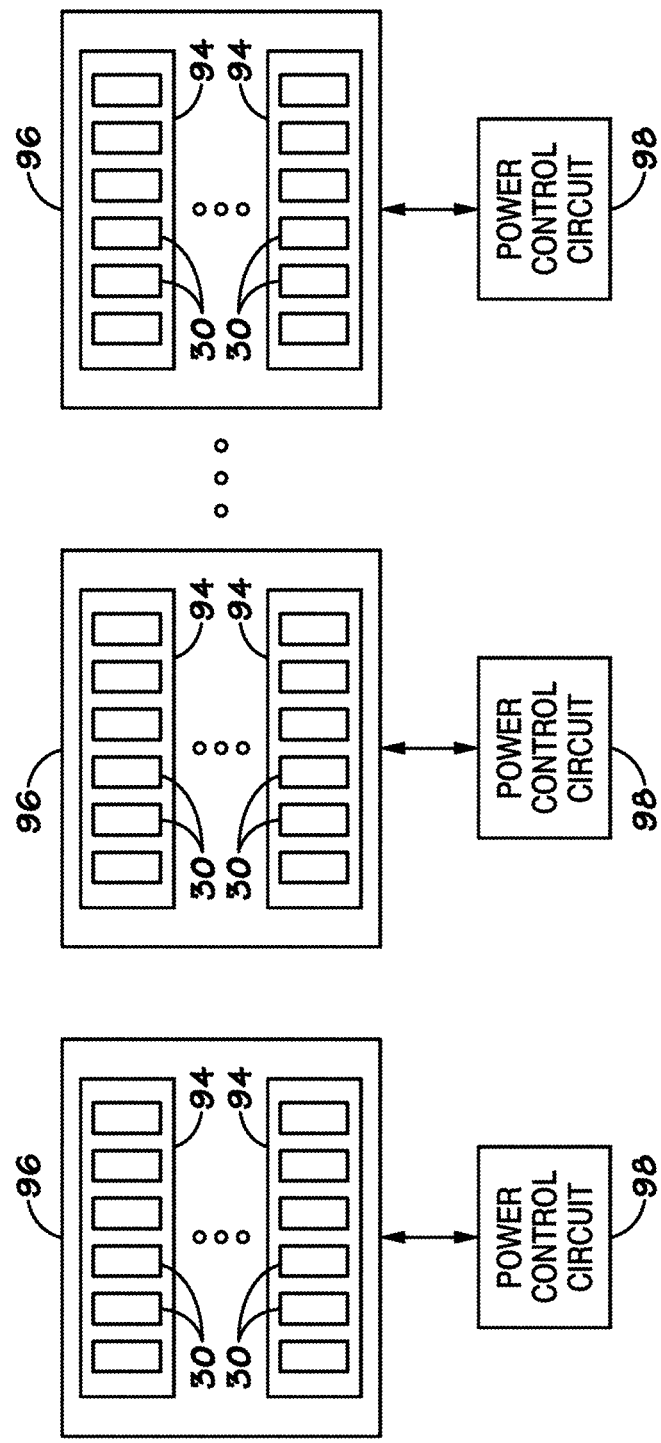
FIG. 13 depicts an arrangement of feature cells into rows and blocks in accordance with an embodiment of the present invention.

Embodiments of the pattern recognition processor 14 may include any arrangement of feature cells 30 (also referred to as state machine elements (SME's)). In one embodiment, as depicted in FIG. 13, the feature cells 30 may be arranged into rows 94, wherein each row 94 may include one or more feature cells 30. The rows 94 may be grouped into blocks 96, wherein each block 96 includes one or more rows 94. A pattern recognition processor 14 may include any number of blocks 96 for implementing the pattern searching described above.

As described above, groups of feature cells 30 may form parallel finite state machines that specify a search criterion or search criteria. Thus, each row 94, and block 96, may be programmed and used to search a data stream according to one or more search criteria. The pattern search described above may sequentially progress through one or more blocks 96 as the data stream 12 is searched for the search criteria. The evaluation of a term of the data stream in each active block 96 is performed during a search cycle. The search cycle may be a part of a broader cycle of the pattern-recognition processor 14 referred to as a pattern search cycle (also referred to as a character cycle). Each pattern search cycle may include multiple internal clock cycles of the pattern recognition processor 14. A pattern search cycle may include, for example, one or more of the following events: inputting a byte from the data stream 12, decoding the byte and driving a corresponding input conductor 37, reading the memory (e.g., memory cells 58) of the processor 14, determining if a feature cell 30 is active and if the data read indicates a match for a respective feature cell, driving the output for the activation-routing matrix 36 for the matching feature cells, and/or propagating signals from the activation-routing matrix 36 to each feature cell 30. The pattern search cycle may also include other events performed during operation of the pattern recognition processor 14.

During the pattern search cycle, the blocks 96 may be accessed during a memory access cycle that includes some of the events of the pattern search cycle. For example, the memory access cycle may include reading memory of the processor 14 (such as to provide a feature cell 30 with "match" indication), a memory read or write for the purposes of testing programming, or verifying the memory of the processor 14, and/or a memory refresh cycle. The memory refresh cycle may refresh the feature cells 30 of a block. In one embodiment, the memory access cycles of the pattern-recognition processor 14 may be interleaved with other events of the pattern search cycle.

In such embodiments, the pattern-recognition processor 14 may access an "active" block of feature cells during a given pattern search cycle when performing the pattern search. An "active" block refers to a block that is currently or will be searching the data stream according to the search terms programmed into that block during a given pattern search cycle. Thus, an "inactive" block refers to a block that is not currently or will not be searching the data stream during a given pattern search cycle.

During operation, the pattern-recognition processor 14 accesses a feature cell 30 or group of feature cells 30 of an active block during each memory access cycle. In one embodiment, to reduce the power consumption incurred by accessing "inactive" blocks during each memory access cycle, each block 96 may be coupled to a power control circuit 98. The power control circuits 98 may be a part of the logic of (or separate logic from) each block 96. The power control circuits 98 may control activation (setting a block to "active") and deactivation (setting a block to "inactive") of each block 96 before, after, or during a pattern search. The power control circuits 98 may also control "permanent" deactivation of each of the blocks 96, wherein permanent deactivation refers to complete disabling of a block 96 so that the block is inactive and not refreshed during a refresh cycle.

In some embodiments, a power control circuit 98 may include the following capabilities: the ability to activate or deactivate (permanently or temporarily) a block based on an identity of the data stream being searched; the ability to automatically activate a block before the pattern search progresses to that block (e.g., when the pattern search will access that block on a subsequent pattern search cycle); the ability to automatically deactivate a block when the pattern search is no longer active in that block (e.g., when a block will not be used on any subsequent pattern search cycle); and the ability to completely disable a block if the block will not be used for any of the finite state machines programmed into the pattern-recognition processor 14.

Figure 14:
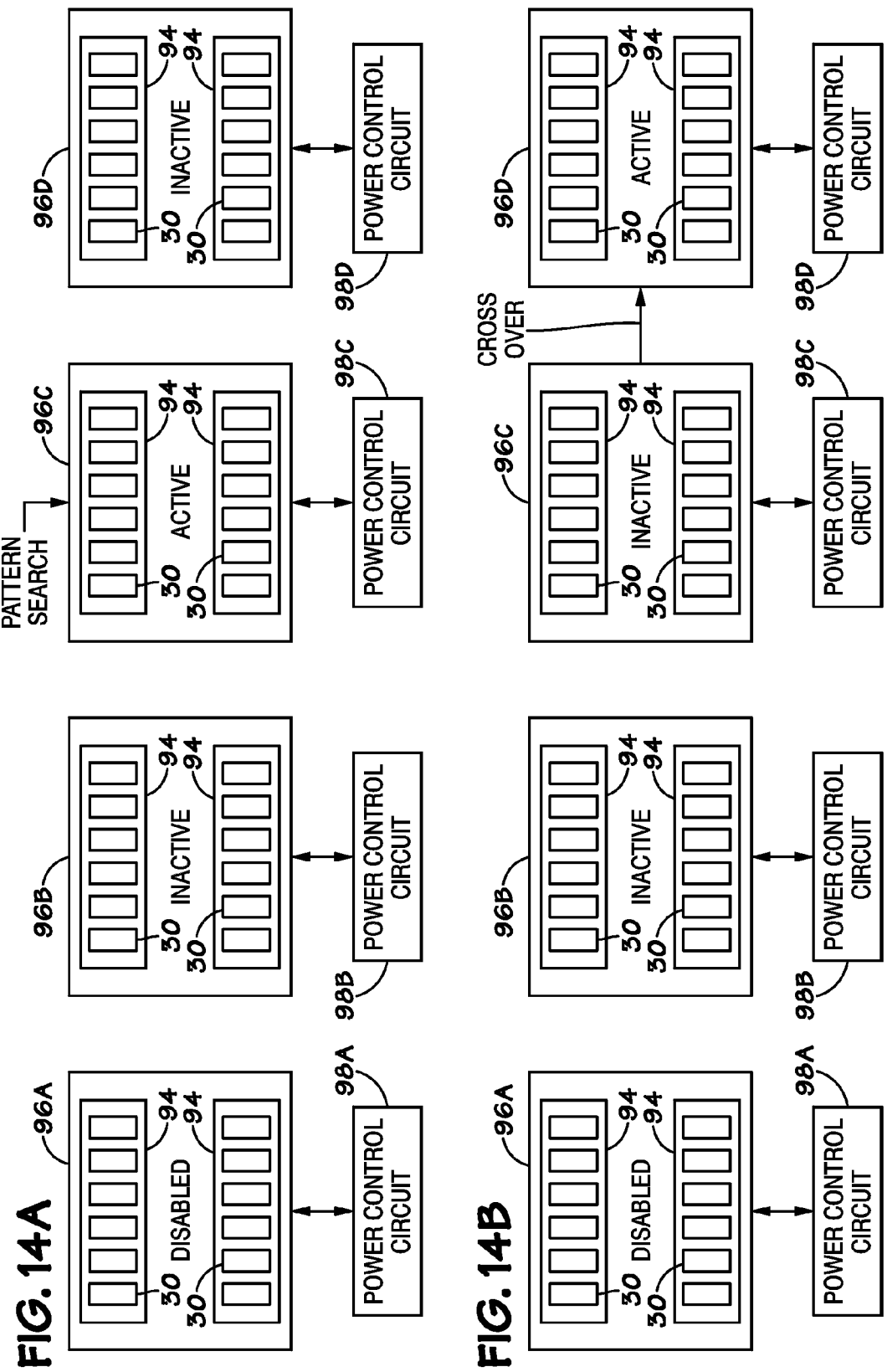
FIGS. 14A and 14B depict operation of the blocks of feature cells in accordance with an embodiment of the present invention.

FIGS. 14A and 14B depict operation of blocks 96A-D of the pattern-recognition processor 14 using the power control capabilities of the power control circuits 98A-98D in accordance with an embodiment of the present invention. Again, as shown in FIGS. 14A and 14B, each block 96A-D is coupled to a respective power control circuit 98A-D that may selectively activate or deactivate (temporarily or permanently) a block. As shown in FIG. 14A, during a pattern search, each block 96 may have a different state. The first block 96A may be disabled, such that this block is not used or even refreshed during operation of the pattern-recognition processor 14. For example, any "extra" blocks, either from manufacturing yield "sparing" or from blocks unused by the current search criteria, may not be programmed as state machines of the processor 14. As a result, such blocks, e.g., block 96A, may be disabled by the corresponding power control circuit 98A. After disabling, the block 96A is disabled and is not refreshed during the refresh of the memory access cycle.

As mentioned above, the power control circuits 98 may also include the ability to activate or deactivate a block based on the identity of the data stream being searched (e.g., HTTP, FTP, SMTP, DNS, etc.). During the pattern search depicted in FIG. 14A, a second block 96B may be deactivated based on the identity of the data stream being searched. In this example, programmed state machines of each block may be programmed for pattern searching a particular type of protocol, language, or other identifier of data. Such identified data may include, but is not limited to, data transfer protocols (e.g., HTTP, FTP, SMTP, DNS, etc.), natural languages, genetic identifiers, etc. For example, in one embodiment directed to internet security, the state machines of block 96B may be programmed for searching patterns in FTP data. The state machines 96C and 96D may be programmed for searching patterns in HTTP data. Once an incoming packet's protocol is identified (such as based on the packet header), only those state machines programmed for searching HTTP data may be used. Thus, block 96B may be deactivated, during the time the HTTP packet is being processed, by the power control circuit 98B. Block 96B may be deactivated such that it is not used in the pattern search cycles. However, block 96B is not permanently disabled and will still be refreshed and available for use in other pattern searches, such when the data stream is identified as FTP data. If the type of a data stream changes, then block 96B may be activated by the corresponding power control circuit 98B. As described further below, blocks may be grouped into different "partitions" based on the identity of data stream 12. A partition refers to a group of blocks programmed for searching a particular type of data. For example, block 96B may be grouped, with other blocks, to a partition for searching FTP data. Similarly, blocks 96C and 96D may be grouped, along with other blocks, to a partition for searching HTTP data. The partition grouping enables groups of blocks to activated or deactivated based on the identity of the data stream 12.

In addition, the power control circuits discussed above may also activate a deactivated block before the pattern search progresses to that block and deactivates a block when the pattern search is no longer active in that block. Blocks 96C and 96D of FIGS. 14A and 14B depict activation and deactivation based on a pattern search progressing from block 96C to block 96D. FIG. 14A shows a pattern search in progress in block 96C, such as during a first pattern search cycle. The pattern search may be evaluating the terms in the data stream according to the search criteria programmed into the state machines (groups of feature cells 30) of block 96C. Block 96C is "active" as it is currently in use during the pattern search. As shown in FIG. 14A, block 96D may be deactivated such that block 96D is not accessed during a memory access cycle, reducing power consumption of the processor 14. If no "starting" term (e.g., the start of a pattern) is programmed in block 96D, block 96D may be deactivated until the pattern search sequence progresses to block 96D.

FIG. 14B depicts a subsequent pattern search cycle of the pattern-recognition processor 14, as the pattern search progresses from block 96C to block 96D. The pattern search may "cross over" from block 96C to block 96D as the data stream is searched for a pattern. The "cross-over" refers to the progression from a first block to a second block during the sequential progression of a pattern search. The pattern search is no longer active in block 96C and is now active in block 96D. When block 96C is detected as inactive, the power control circuit 96C may deactivate block 96C until another pattern search progresses to block 96C. The power control circuit 96D may activate block 96D before the pattern search progresses to block 96D. Thus, block 96D is activated on a predictive, "as-needed" basis. As described further below, the power control circuit 98D and/or block 96D may detect when the pattern search is about to reach block 96D and activate block 96D before the next pattern search cycle. Thus, as the pattern search sequence continues through each block of feature cells, inactive blocks may be deactivated and prospective blocks may be activated as they are needed.

Additionally, other embodiments may include special search criteria that affect the activation or deactivation of a block before, during, or after a pattern search progresses through that block. Such special search criteria may include regular expression (RegEx) operators, such as the asterisk (*), the question mark (?) and/or the plus sign (+). For example, the asterisk ("*") operator that specifies matching everything and anything until the end of a the terms of a data stream may be implemented by an activation command that specifies that a block, once activated, is always active until the end of the terms of the data stream. Any special search criteria may be implemented into the power control techniques discussed above by specifying an activation or deactivation scheme suitable for those special search criteria.

Each block of the pattern-recognition processor 14 may include signals and/or configuration bits to provide for the power control techniques described above. For example, in addition to the power control circuits, each block may include logic to generate a signal that indicate a row contains "active" feature cells and/or a signal(s) that indicate that the block contains a feature cell that is next in the pattern search sequence. Additionally, a block may include logic configured to transmit or receive various control and configuration signals. These control and configuration signals may include: an indication that the block is used for the current data stream (block active/inactive); an indication of a starting term; a once activated/always activated signal, such as for the special search criteria discussed above; a refresh signal; and a block flow enable signal.

The selective activation and deactivation scheme described above may indicate whether or not a particular block is disabled (e.g., if the block will ever be used), indicate whether or not a block is part of a group to be currently used, indicate whether or not a block contains feature cells of the "start" of a pattern, and activate blocks as needed during the pattern search sequence. In some embodiments, to implement the block wakeup scheme the blocks 96 may include configuration bits or other data indicators to indicate the status of a block. These bits may be modified by the various control signals discussed herein. For example, a block 96 may include one or more configuration bits to indicate if the block is disabled. As mentioned above, in some embodiments, the blocks 96 may be grouped into partitions such that each partition includes blocks to be used for a particular type of data stream. In such an embodiment, each block may include one or configuration bits to indicate the partition to which the respective block belongs. Additionally, each block 96 may include one or more configuration bits that indicate if the block includes feature cells 30 that include the "start" (e.g., beginning) of a pattern. Such blocks may always be active during a given pattern search sequence using that partition. Additionally, in such an embodiment, all the other blocks in a partition may be selectively activated and deactivated as described above.

Figure 15:
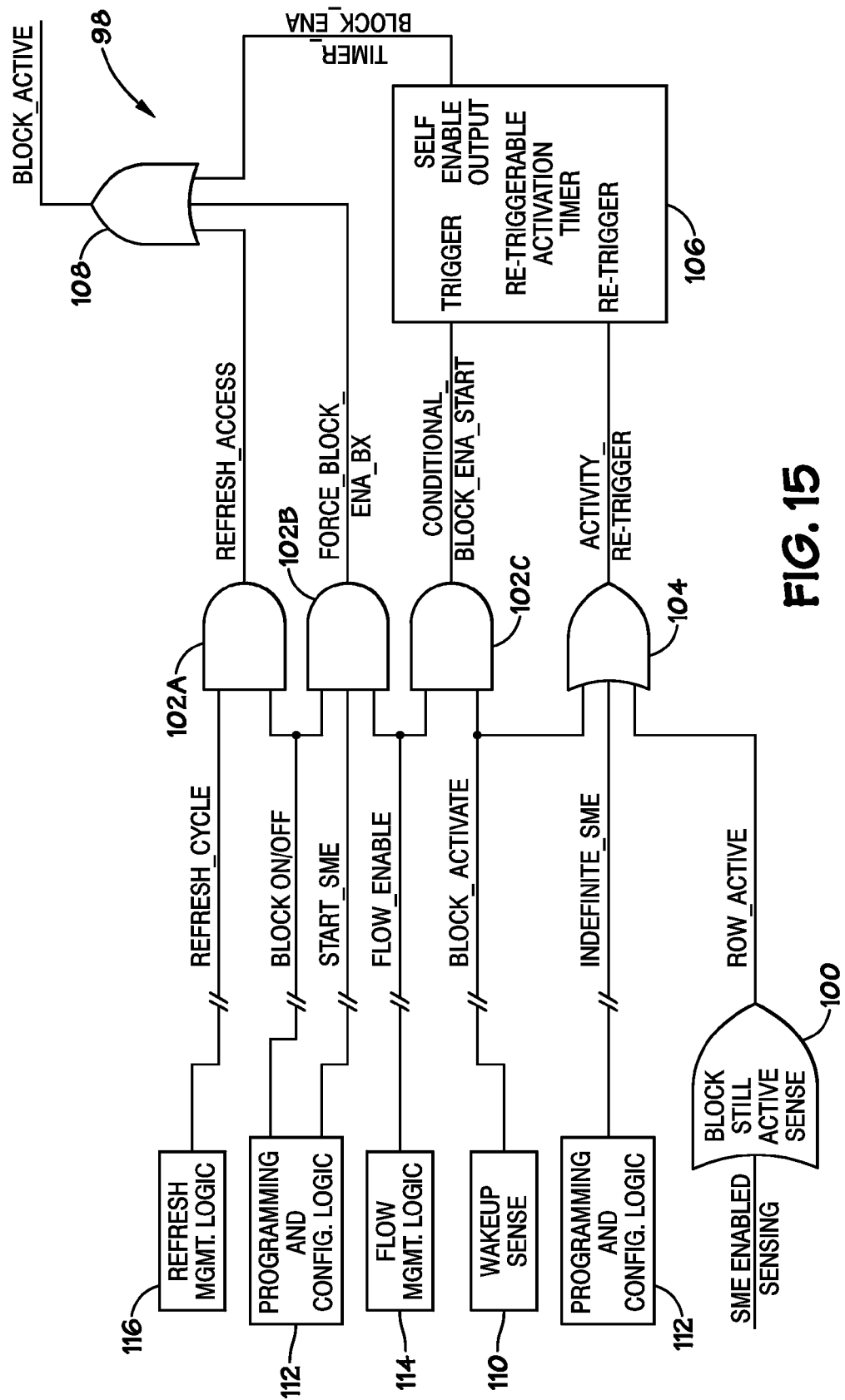
FIG. 15 depicts a logic schematic of a power control circuit in accordance with an embodiment of the present invention.

FIG. 15 depicts a logic schematic of a power control circuit 98 in accordance with an embodiment of the present invention. The power control circuit 98 may determine when a block should be active, when a block, once active, should temporarily be deactivated, and when a block should be permanently deactivated (i.e., disabled, such that it does not respond to refresh cycle requests).

The power control circuit 98 may include a "Block Still Active Sense" component 100, AND gates 102, OR gate 104, a re-triggerable deactivation timer 106, and an OR gate 108 that outputs a "Block_Active" signal. The power control circuit 98 may receive a "Block_Activate" signal from a block wakeup scheme 110. The block wakeup scheme may, for example, indicate whether or not a particular block is disabled (e.g., if the block will every be used), indicate whether or not a block is part of a group to be currently used, indicate whether or not a block contains feature cells of the "start" of a pattern, and activate blocks as needed during the pattern search sequence. The Block Still Active Sense component 100 may receive and/or detect signals from a block that indicate if the block is still active (according to the resolution provided by such detection). For example, the Block Still Active Sense component may receive or detect an active feature cell 30, row 94, or other activity in the block 96 and output, for example, a Row_Active signal that indicates a row of a block is still active.

In one embodiment, the power control circuit may be controlled and configured by five signals, as described below in Table 1:

| Signal Name | Function |
| --- | --- |
| Refresh_Cycle | Provides notification that the following memory cycle is to be a refresh cycle |
| Block_On/Off | Activates or Deactivates the block for every cycle |
| Start_State_Machine_Element (Start_SME) | At least one start of a starting search term is contained in the block |
| Flow_Enable | The block contains search terms that are part of the FSM pertinent to this data stream |
| Indefinite_State_Machine_Element (Indefinite_SME) | The block contains search terms that are "once activated, always active" |

The states of the Block_On/Off signal, the Start_SME signal, and the Indefinite_SME signal may be determined via a software compiler operating the pattern-recognition processor 14 and generated via other logic components of the pattern-recognition processor 14. For example, the Block_On/Off, the Start_SME signal, and the Indefinite_SME signal may be generated from a programming and control logic 112. The software complier may specify the power configuration, based on the placement and routing of the different finite state machines programmed into the pattern-recognition processor. These signals may be set as part of the search criteria programmed into the processor 14 and may not change during operation.

The Block_On/Off may be used to activate or deactivate a block during the progression of the pattern search, as described above. The Flow_Enable signal may also be determined by the compiler and may change during operation of the processor 14, depending on the finite state machines processing data. The software compiler may determine which finite state machines are needed (and, thus, what blocks are needed) and set the Flow_Enable signal to activate or deactivate a block for a data stream. The Flow_Enable signal may be generated from a flow management logic 114 that can interpret an identifier of a data stream and provide the appropriate Flow_Enable signal. For example, as discussed above, some blocks of finite state machines may be programmed for use with a particular protocol or language, such that other blocks not programmed for that purpose may be deactivated.

The Refresh_Cycle signal may be generated by a refresh management logic 116 that refreshes the feature cells 30 during operation of the pattern-recognition processor 14. The assertion of the Refresh_Cycle signal may be set independently of the pattern search or other operations of the pattern-recognition processor 14. If a block is never used during operation of the pattern-recognition processor 14, such as block 96A discussed above in FIGS. 14A and 14B, the Refresh_Cycle signal may be disabled for that block, thus disabling any refresh cycles of that block during the memory access cycle and eliminating the power consumption for that refresh operation.

The Refresh_Cycle, the Block_On/Off signal, the Start_SME signal, and the Flow_Enable signal may be passed through AND gates 102 or other logic components. For example, the Refresh-Cycle signal and the Block_On/Off signal may be provided to a first AND gate 102A that outputs a Refresh_Access signal to OR gate 108, indicating that a block will be refreshed. The Block_On/Off signal and the Start_SME signal may be provided to a second AND gate 102B that outputs a "Force_Block_Enable" Signal to OR gate 108, indicating that a block includes a starting search term and should be active. The Block_Activate signal and the Flow Enable signal may be provided to a third AND gate 102B that outputs a Conditional_Block Enable_Start signal to the re-triggerable deactivation timer 106.

Additionally, the Block_Activate signal from the wakeup scheme 110, the Indefinite_SME signal from the programming and control logic 114, and the Row_Active signal from the Block Still Active Sense component 112 may be provided to the second OR gate 104 that outputs an Activity_Re-Trigger signal to the re-triggerable deactivation timer 106.

The re-triggerable deactivation timer 106 enables the power control circuit 98 to account for time delays in the architecture of the pattern-recognition processor 14 before deactivating a block. The re-triggerable deactivation timer 106 may receive the conditional_block_enable_start signal and Activity_Re-Trigger signal and provide a delay based on those signals. The re-triggerable deactivation timer 106 may output a Time_Block_Enable signal to OR gate 108.

The re-triggerable deactivation timer 106 may prevent deactivation of a block for a specified duration. The duration may be determined in units of time or cycles. For any given architecture of the power-recognition processor 14, the detection of the active/inactive status of the feature cells of a block may be limited to the cycle resolution provided by that architecture. For example, in an embodiment having the ability to detect active feature cells of a block at a resolution of four pattern search cycles, the re-triggerable deactivation timer 106 may allow deactivation of that block only after four pattern search cycles have occurred since the last "active" status was detected.

Each time a block is accessed during a pattern search, the re-triggerable deactivation timer 106 may reset to allow completion of the pattern search in the block. In the example discussed above, after the block is active again, the re-triggerable deactivation timer 106 resets so that another delay of four pattern search cycles is provided before the block can be deactivated. In some embodiments, the re-triggerable deactivation timer 106 may also be configured to account for delays that occur in the generation of the signals used to determine if a block should remain active. For example, the Row_Active signal may be relatively slow to generate and propagate such that the re-triggerable deactivation timer 106 may be configured to add a delay to compensate. In this manner, any resolution of detection of the status of a block may be accounted for by introducing the desired time delay and reset into the re-triggerable deactivation timer 106.

Further, it should be appreciated that the re-triggerable deactivation timer 106 may be configured, to ensure that a block is active when needed during a pattern search, as opposed to enabling premature deactivation of the block which could impair operation of the pattern-recognition processor 14. In contrast, the activation time of a block may be sufficient to ensure that the block is active in time for the next pattern search cycle. In one embodiment, the pattern-recognition processor 14 may include signals that enable a pattern search to cross-over from a first block to another block of feature cells, as illustrated above in FIG. 14B.

Based on the received signals, the re-triggerable deactivation timer 106 outputs a Timer_Block_Enable signal to OR gate 108. Thus, as shown in FIG. 15, the re-triggerable deactivation timer 106 may trigger or "re-trigger" based on signals received from the flow management logic, the wakeup logic, the programming and configuration logic, and the Block Still Active Sense component.

The output of the power control circuit is a Block_Active signal that activates or deactivates a block based on the Refresh_Access signal, the Force_Block_Enable_BX signal, or the Timer_Block_Enable signal. Thus, based on the various control signals, the Block_Active signal may activate or deactivate a block based on if the block is to be refreshed, is enabled for a data stream, is active or inactive for a data stream, is part of a "once activated, always active" search criteria, etc.

As discussed above, a block controlled by the power control circuit 98 should be activated in time for the next pattern search as the pattern search sequence progresses to (crosses-over) that block of feature cells. In some embodiments having a "non-pipelined architecture," the activation of a block may rely on the same cross-over signal that indicates when a pattern search crosses over to the next block. However, in other embodiments, such as a "pipelined" architecture of the pattern-recognition processor 14, the events of a pattern search cycle are interleaved with the memory access cycles. In such an embodiment, the next memory access cycle begins before the completion of the current pattern search in a block. In these embodiments, a predicative activation scheme may be used to ensure the next block of a pattern search sequence is activated in time for the next pattern search and the cross-over to that block.

Figure 16:
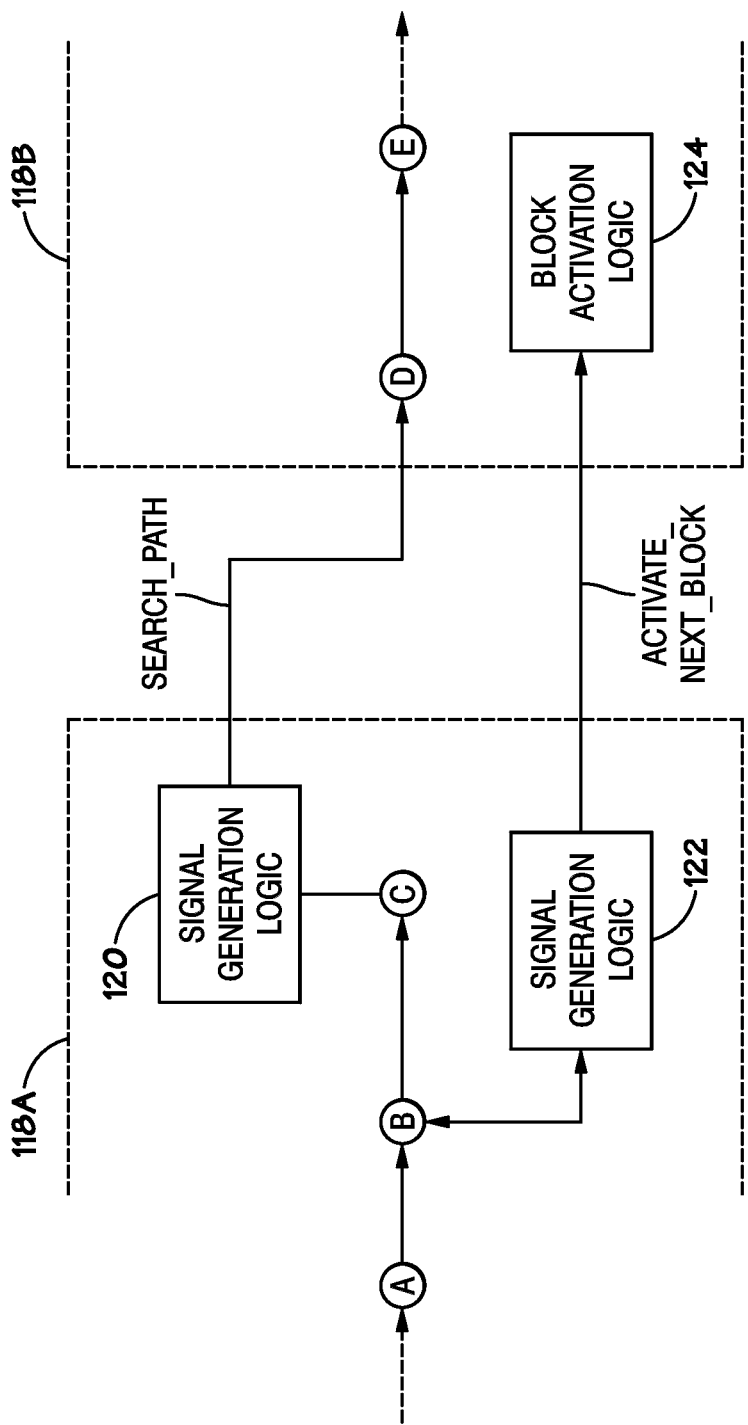
FIG. 16 depicts a predictive activation scheme for blocks of the pattern-recognition processor in accordance with an embodiment of the present invention.

FIG. 16 is a diagram of a predictive activation scheme for a pattern-recognition processor 14 in accordance with an embodiment of the present invention. The predicative activation scheme may generate an "early activate" signal that is sent to the next block of a pattern search sequence whenever the pattern search in the current block progresses to a specific state.

FIG. 16 depicts a pattern search between a first block 118A and a second block 118B. As shown in FIG. 18, the first block 118A may include programmed state machines (groups of feature cells) of block 118A configured to search a data stream according to search criteria. During a first pattern search cycle, for example, block 118A may be active and block 118B may be inactive. As the pattern search progresses through the block 118A, the state of the block may change from state A, to state B, and to state C as different search terms or criteria (e.g., characters) are matched in the block 118A. At the completion of processing in block 118A (as indicated by state C), a "cross-over" signal may be generated by a signal generation logic 120 and provided from block 118A to block 118B, to indicate that the pattern search will be crossing-over to block 118B for the next pattern search cycle.

During processing in block 118A, an "activate next block" signal may be generated, by a second signal generation logic 122, and provided from block 118A to block 118A, based on another state of block 118A. For example, as shown in FIG. 16, the activate_next_block signal may be generated, when block 118B progresses to state B during the pattern search. Thus, the activate_next_block signal is generated at an earlier state than the cross-over signal. The activate_next_block signal from block 118A may be received by a block activation logic 124 of block 118B. The block activation logic 122 may activate block 118B in response to the received activate_next_block signal. Block 118B may then be ready to respond when the pattern search crosses-over to block 118B (e.g., when block 118B receives the cross-over signal provided from block 118A). The signal generation logic 120 and the signal generation logic 122, to generate both signals, may be identical logic programmed to respond at different states of block 118A.

The activate_next_block signal may be generated at any state of block 118A, to ensure that the block 118B is activated in time for the cross-over of the pattern search. For example, the activate_next_block signal may be generated at state A or any earlier state of block 118A, depending on the architecture of the pattern-recognition processor 14. It should be appreciated that activating block 118B earlier than needed may slightly increase power consumption, but does not affect the pattern search sequence. After receiving the activate_next_block signal, the receiving block 118B may start responding to all memory cycles. However, even though the memory accesses are executed on each memory cycle, the pattern search using block 118B may not be performed on the next pattern search cycle until the cross-over signal is received.

Figure 17:
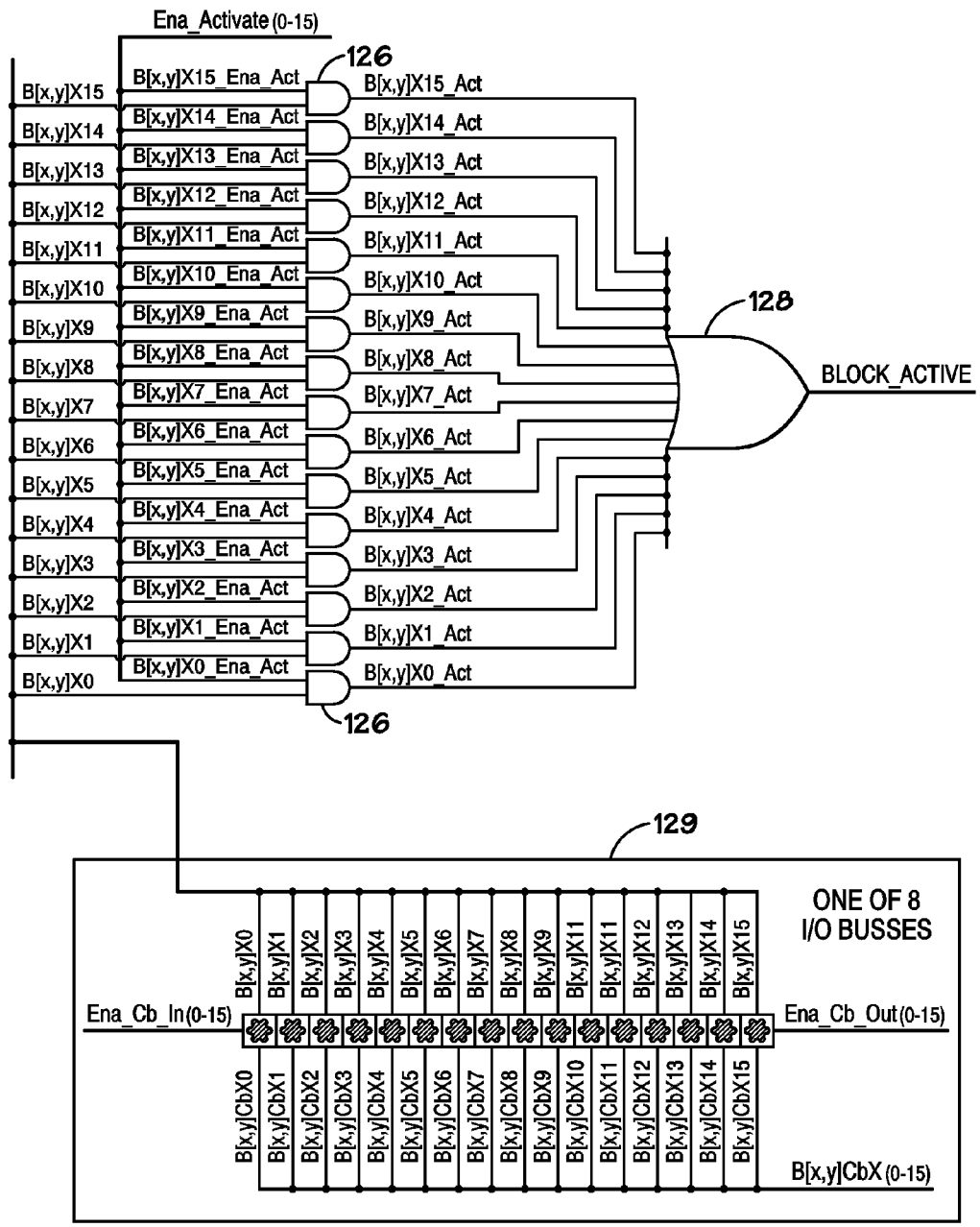
FIG. 17 depicts a logic diagram for processing signals at a block in accordance with an embodiment of the present invention.

FIG. 17 depicts a logic diagram for processing the Activate_Next_Block signals at a block, in accordance with an embodiment of the present invention. A block may be coupled to a bus 124 that transmits and receives signals over block index lines (BX) and block connect index lines (BCX). In one embodiment, one input may be designated for activating the block, and another input may be dedicated to indicating the pattern sequence (e.g., the cross-over from a one block to another block during progression of the pattern search sequence). The BX signals may be provided to a plurality of AND gates 126. Block enable activation signals may also be provided to each AND gate 126 with the corresponding BX signal. The outputs of the AND gates 126 may be provided to an OR gate 128 that outputs a "block_activate" signal for activating a block.

In this manner, the AND gates 126 may "mask" those input signals that are not used to activate the block and only enable the proper activate signals to activate the block that receives the Block_Activate signal output from the OR gate 128. As shown in FIG. 17, there may be multiple paths (e.g., multiple signals) that could activate a block.

It should be appreciated that the logic described above may have slightly different configurations based on characteristics of the pattern-recognition processor 14, such as number of feature cells in a block, number of feature cells in a row, the granularity of the ability to detect active blocks, etc.

What is claimed is:

1. A method for searching for a pattern of a data stream using a plurality of blocks of a pattern recognition processor, wherein each block comprises a plurality of feature cells, and each feature cell comprises a search-term cell, and wherein the search-term cell comprises a plurality of inputs, an output, and a plurality of memory cells each coupled to a respective input of the plurality of inputs and to the output, the method comprising:

deactivating, using a first power control circuit, a first block of the plurality of blocks when the pattern search is no longer actively being searched by any of the plurality of feature cells in the first block as the pattern search progresses to a second block of the plurality of blocks from the first block for active searching of the data stream by at least one of the feature cells of the plurality of feature cells in the second block.

2. The method of claim 1, comprising activating, using a second power control circuit, the second block of the plurality of blocks before the pattern search progresses to the second block such that the second block is activated for the pattern search.

3. The method of claim 1, comprising deactivating, using a second power control circuit, a third block of the plurality of blocks based on an identification of the data stream.

4. The method of claim 1, wherein one or more of the plurality of blocks comprise a plurality of state machines programmed from the plurality of feature cells.

5. The method of claim 4, comprising disabling, using a second power control circuit, a third block of the plurality of blocks if the block does not comprise any programmed state machines.

6. The method of claim 1, comprising providing a first signal from the first block to a second block of the plurality of blocks to cause activation of the second block.

7. The method of claim 6, wherein the first signal is based on a state of the first block.

8. The method of claim 6, comprising providing a second signal from the first block to the second block to indicate a cross-over of the pattern search.

9. The method of claim 8, wherein the second signal is based on a state of the first block.

10. The method of claim 6, comprising deactivating, using a second power control circuit, the second block when the pattern search is no longer active in the second block.

11. The method of claim 6, comprising activating, using a second power control circuit, the second block such that the block is always active for the remainder of the pattern search.

12. A method, comprising:
   initiating a pattern search of a data stream in a first block in a first pattern search cycle;
   providing a first signal from the first block to a second block, wherein the first signal activates the second block for a second pattern search cycle, and wherein the first and second blocks each comprise a plurality of feature cells configured to search the data stream, and each feature cell comprises a search-term cell, and wherein the search-term cell comprises a plurality of inputs, an output, and a plurality of memory cells each coupled to a respective input of the plurality of inputs and to the output; and
   providing a second signal from the first block to the second block to initiate the pattern search of the data stream in the second block in the second pattern search cycle by at least one of one of the feature cells of the plurality of feature cells in the second block.

13. The method of claim 12, wherein providing the first signal comprises providing the first signal when the pattern search progresses to a first state in the first block.

14. The method of claim 12, wherein providing the second signal comprises providing the second signal when the pattern search progresses to a second state in the first block.

15. A device, comprising:
   a pattern-recognition processor comprising:
      a plurality of blocks, wherein one or more blocks of the plurality of blocks comprise one or more of a plurality of state machines, and wherein each block of the plurality of blocks comprises a plurality of feature cells, and each feature cell comprises a search-term cell, and wherein the search-term cell comprises a plurality of inputs, an output, and a plurality of memory cells each coupled to a respective input of the plurality of inputs and to the output; and
      a plurality of power control circuits, wherein each power control circuit is coupled to a respective one of the plurality of blocks, and wherein each power control circuit is configured to activate and deactivate the respective block as a pattern search of a data stream by at least one of the feature cells of the plurality of feature cells of the respective block progresses to a second respective block of the plurality of blocks for active searching of the data stream by at least one of the feature cells of the plurality of feature cells in the second respective block.

16. The device of claim 15, wherein each of the power control circuits provide a signal for activating a respective one of the plurality of blocks.

17. The device of claim 15, wherein each of the power control circuits is configured to deactivate a respective block based on an identification of a data stream.

18. The device of claim 15, wherein each of the power control circuits is configured to disable a respective block if the block does not comprise any programmed state elements.

19. The device of claim 15, wherein each of the power control circuits is configured to disable a memory refresh of a respective block.

20. The device of claim 15, wherein each of the power control circuits is configured to activate a respective block based on a progression of a pattern search.

21. The device of claim 15, wherein each of the power control circuits comprises a timer component configured to delay deactivation of a respective block based on a determination of a status of a respective block.

22. The device of claim 21, wherein the timer component is configured to reset upon determination of an active status of the respective block.

23. A device, comprising:
   a pattern-recognition processor comprising:
      a first block having a first plurality of feature cells configured to search a data stream; and
      a second block having a second plurality of feature cells configured to search the data stream, wherein each feature cell of the first and second plurality of feature cells comprises a search-term cell, and wherein the search-term cell comprises a plurality of inputs, an output, and a plurality of memory cells each coupled to a respective input of the plurality of inputs and to the output;
      wherein the first block comprises:
         first logic configured to activate the second block during a first pattern search cycle of the data stream by at least one feature cell of the first plurality of feature cells such that the second block is activated for a second pattern search cycle of the data stream by at least one feature cell of the second plurality of feature cells; and
         second logic configured to cause a pattern search to cross-over from the first block to the second block to continue the pattern search of the data stream in the second block by the at least one feature cell of the second plurality of feature cells.

24. The device of claim 23, wherein the first logic is configured to activate the second block based on a first state of the first block during the first pattern search cycle.

25. The device of claim 23, wherein the second logic is configured to cross over the pattern search based on a second state of the first block.

26. The device of claim 23, wherein the first block comprises third logic configured to indicate that the first block is active.

27. The device of claim 23, wherein the second block comprises fourth logic configured to indicate that the second block is next in the pattern search sequence.

28. A pattern-recognition processor, comprising:
   a plurality of programmable state machine elements wherein each programmable state machine element of the plurality of programmable state machine elements comprises a plurality of inputs, an output, and a plurality of memory cells each coupled to a respective input of the plurality of inputs and to the output; and a power control circuit, wherein the power control circuit is configured to selectively activate the plurality of programmable state machine elements at substantially the same time during the pattern search of a data stream based on a progression of the pattern search of the data stream from actively being searched by at least one programmable state machine element of a second plurality of programmable state machine elements to actively being searched by at least one programmable state machine element of the plurality of programmable state machine elements.

29. The pattern-recognition processor of claim 28, comprising a block of state machine elements.

30. The pattern-recognition processor of claim 29, wherein the power control circuit is a part of logic of the block.

31. The pattern-recognition processor of claim 29, wherein the power control circuit is separate from logic of the block.

32. A method of searching a data stream according to search criteria programmed as a plurality of state machines, the method comprising:
activating a first plurality of state machines of a block at substantially the same time before the pattern search of a data stream progresses to the first plurality of state machines to actively search the data stream by at least one state machine of the first plurality of state machines; and
deactivating the first plurality of state machines at substantially the same time, based on a determination that the pattern search of the data stream is no longer active in the block and has progressed to a second block comprising a second plurality of state machines to actively search the data stream by at least one state machine of the second plurality of state machines, wherein each state machine of the first plurality of state machines and the second plurality of state machines comprises a plurality of inputs, an output, and a plurality of memory cells each coupled to a respective input of the plurality of inputs and to the output.

33. The method of claim 32, further comprising determining an identifier of the data stream.

34. The method of claim 33, further comprising deactivating the second plurality of state machines at substantially the same time based on the identifier.

35. The method of claim 33, wherein the identifier comprises an Internet transfer protocol, a natural language, or a genetic identifier.

36. A pattern-recognition processor, comprising:
a plurality of programmable state machine elements, wherein each programmable state machine element of the plurality of programmable state machine elements comprises a plurality of inputs, an output, and a plurality of memory cells each coupled to a respective input of the plurality of inputs and to the output; and
a power control circuit, wherein the power control circuit is configured to selectively deactivate the plurality of programmable state machine elements at substantially the same time during the pattern search of a data stream based on a progression of the pattern search of the data stream by at least one state machine of the plurality of programmable state machine elements from the plurality of programmable state machine elements to a second plurality of programmable state machine elements to actively search the data stream by at least one state machine of the plurality of programmable state machine elements.

37. A pattern-recognition processor, comprising:
a plurality of programmable state machine elements, wherein each programmable state machine element of the plurality of programmable state machine elements comprises a plurality of inputs, an output, and a plurality of memory cells each coupled to a respective input of the plurality of inputs and to the output; and
a power control circuit, wherein the power control circuit is configured to selectively deactivate the plurality of programmable state machine elements at substantially the same time during the pattern search based on an identification of a data stream of the pattern search and activate the plurality of programmable state machine elements to actively search the data stream by at least one state machine of the plurality of programmable state machines at substantially the same time based upon a signal indicative of the progression of the pattern search of the data stream through a second plurality of programmable state machine elements.

* * * * *